United States Patent
Thomson et al.

(10) Patent No.: US 11,938,461 B2
(45) Date of Patent: Mar. 26, 2024

(54) LOW EMISSION ADSORBENT

(71) Applicant: INGEVITY SOUTH CAROLINA, LLC, North Charleston, SC (US)

(72) Inventors: Cameron I. Thomson, Charleston, SC (US); Marta Leon Garcia, Mount Pleasant, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 509 days.

(21) Appl. No.: 17/110,016

(22) Filed: Dec. 2, 2020

(65) Prior Publication Data
US 2021/0162368 A1 Jun. 3, 2021

Related U.S. Application Data

(60) Provisional application No. 62/942,615, filed on Dec. 2, 2019.

(51) Int. Cl.
| | |
|---|---|
| *B01J 20/20* | (2006.01) |
| *B01D 53/04* | (2006.01) |
| *B01J 20/28* | (2006.01) |
| *B01J 20/30* | (2006.01) |

(52) U.S. Cl.
CPC .......... *B01J 20/20* (2013.01); *B01D 53/0415* (2013.01); *B01J 20/28004* (2013.01); *B01J 20/28019* (2013.01); *B01J 20/2803* (2013.01); *B01J 20/28045* (2013.01); *B01J 20/28064* (2013.01); *B01J 20/28066* (2013.01); *B01J 20/3007* (2013.01); *B01J 20/3042* (2013.01); *B01D 2253/102* (2013.01); *B01D 2253/25* (2013.01); *B01D 2253/304* (2013.01); *B01D 2253/306* (2013.01); *B01D 2253/3425* (2013.01)

(58) Field of Classification Search
CPC . B01D 53/04; B01J 20/20; B01J 20/28; B01J 20/30
See application file for complete search history.

(56) References Cited

U.S. PATENT DOCUMENTS

| | | | |
|---|---|---|---|
| 4,894,072 A | 1/1990 | Turner et al. | |
| 5,204,310 A * | 4/1993 | Tolles | ................... C01B 32/342 502/425 |
| 6,098,601 A | 8/2000 | Reddy | |

(Continued)

FOREIGN PATENT DOCUMENTS

| | | |
|---|---|---|
| CN | 1345628 A | 4/2002 |
| CN | 106669636 A | 5/2017 |

(Continued)

OTHER PUBLICATIONS

SAE Technical Papers 902119, Oct. 25, 1990, "Performance of Activated Carbon in Evaporative Loss Control Systems" (by H.R. Johnson, R.S. Williams) (1990).

(Continued)

*Primary Examiner* — Sharon Pregler
(74) *Attorney, Agent, or Firm* — Bryan D. Zerhusen, Esq.; Nicholas R. Herrel, Esq.; CANTOR COLBURN LLP

(57) ABSTRACT

The present description provides adsorbent compositions and materials, and systems comprising the same that provide low DBL bleed emission performance. The described materials provide unexpected production advantages as compared to currently available materials.

15 Claims, 9 Drawing Sheets

(56) References Cited

U.S. PATENT DOCUMENTS

| | | | |
|---|---|---|---|
| 6,279,548 B1 | 8/2001 | Reddy | |
| 6,472,343 B1 | 10/2002 | McCrae et al. | |
| 6,540,815 B1 | 4/2003 | Hiltzik et al. | |
| RE38,844 E | 10/2005 | Hiltzik et al. | |
| 9,657,691 B2 | 5/2017 | Eguchi et al. | |
| 9,732,649 B2 | 8/2017 | Hiltzik et al. | |
| 2016/0271555 A1 | 9/2016 | Hiltzik et al. | |
| 2018/0207611 A1* | 7/2018 | Byrne | B01J 20/10 |
| 2019/0101083 A1 | 4/2019 | Hiltzik et al. | |
| 2019/0226426 A1 | 7/2019 | Hiltzik et al. | |

FOREIGN PATENT DOCUMENTS

| | | |
|---|---|---|
| CN | 109529766 A | 3/2019 |
| CN | 109700071 A | 5/2019 |
| JP | 2004202492 A | 7/2004 |

OTHER PUBLICATIONS

Burchell, T.D., "Carbon Material for Advanced Technologies" 1999, pp. 252-253 (1999).
CARB's LEV III BETP procedure (section D.12 in California Evaporative Emissions Standards and Test Procedures for 2001 and Subsequent Model Motor Vehicles, Mar. 22, 2012).
Limits and Measurement Methods for Emissions from Light-Duty Vehicles, GB 18352.6-2016, also known as "China 6".
SAE Technical Paper 2001-01-0733, titled "Impact and Control of Canister Bleed Emissions," by R. S. Williams and C. R. Clontz.
International Search Report and Written Opinion for PCT/US2020/062896 dated Mar. 10, 2021.

\* cited by examiner

LOW EMISSION ADSORBENT

CROSS-REFERENCE TO RELATED APPLICATION

The present application claims the benefit of priority under 35 U.S.C. 119(e) to U.S. Provisional Patent Application Ser. No. 62/942,615; filed: 2 Dec. 2019, and titled: Low Bleed Emission Adsorbent, which is incorporated herein by reference in its entirety.

BACKGROUND

1. Field of the Discovery

The present disclosure, in various aspects and embodiments, relates to adsorbent materials and evaporative emission control systems comprising the same.

2. Background Information

Evaporation of gasoline fuel from motor vehicle fuel systems is a major potential source of hydrocarbon air pollution. These fuel vapor emissions occur when the vehicle is running, refueling, or parked with the engine off. Such emissions can be controlled by the canister systems that employ activated carbon to adsorb the fuel vapor emitted from the fuel systems. Under certain modes of engine operation, the adsorbed fuel vapor is periodically removed from the activated carbon by purging the canister systems with ambient air to desorb the fuel vapor from the activated carbon. The regenerated carbon is then ready to adsorb additional fuel vapor.

It is well known in the art that a more space efficient activated carbon adsorbent for this application is characterized by an n-butane vapor adsorption isotherm that has adsorption capacity steeply sloped towards high vapor partial pressures (U.S. Pat. No. 6,540,815). In that way, the adsorbent has a high capacity at relatively high concentrations of the type of vapors present with gasoline fuel, and the adsorbent favors release of these captured vapors when exposed to a low vapor concentration or partial pressure, such as during purge. These high performance activated carbons have a large amount of pore volume as "small mesopores" (e.g., SAE Technical Papers 902119 and 2001-03-0733, and Burchell 1999, pp. 252-253), which are preferably about 1.8 nm to about 5 nm in size as measured by the BJH method of analysis of nitrogen adsorption isotherms (e.g., U.S. Pat. No. 5,204,310). (According to IUPAC classification, these are pores of about 1.8-2 nm size within the <2 nm micropore size range, plus pores of about 2-5 nm size within the 2-50 nm mesopore size range.). The small mesopores are sufficiently small to capture vapors as a condensed phase, and yet readily empty upon exposure to a low partial pressure of vapor. Accordingly, the volume in these pores correlates linearly with the recoverable vapor capacity by the adsorbent in a canister volume, known as gasoline working capacity (GWC), and likewise correlates linearly with the ASTM butane working capacity (BWC) of the adsorbent, as measured by the standard ASTM 5228 method, which are incorporated herein by reference. Generally, the range of ASTM BWC of commercial activated carbon products for this application is from about 3 to about 17 g/dL, with 9+g/dL BWC carbons favored for working capacity towards the fuel vapor source of the canister system, and lower BWC carbons used in one or more subsequent volumes towards the atmosphere port or vent-side (i.e., vent-side adsorbent volumes).

An increase in environmental concerns has continued to drive strict regulations of hydrocarbon emissions. When a vehicle is parked in a warm environment during the daytime heating (i.e., diurnal heating), the temperature in the fuel tank increases resulting in an increased vapor pressure in the fuel tank. Normally, to prevent the leaking of the fuel vapor from the vehicle into the atmosphere, the fuel tank is vented through a conduit to a canister containing suitable fuel adsorbent materials that can temporarily adsorb the fuel vapor. The canister defines a vapor or fluid stream path such that when the vehicle is at rest the fuel vapor of fluid passes from the fuel tank, through the fuel tank conduit, through one or more adsorbent volumes, and out to a vent port, which opens to the atmosphere. A mixture of fuel vapor and air from the fuel tank enters the canister through a fuel vapor inlet of the canister and diffuses into the adsorbent volume where the fuel vapor is adsorbed in temporary storage and the purified air is released to the atmosphere through a vent port of the canister. Once the engine is turned on, ambient air is drawn into the canister system through the vent port of the canister. The purge air flows through the adsorbent volume inside the canister and desorbs the fuel vapor adsorbed on the adsorbent volume before entering the internal combustion engine through a fuel vapor purge conduit. The purge air does not desorb the entire fuel vapor adsorbed on the adsorbent volume, resulting in a residue hydrocarbon ("heel") that may be emitted to the atmosphere.

In addition, the heel in local equilibrium with the gas phase also permits fuel vapors from the fuel tank to migrate through the canister system as emissions. Such emissions typically occur when a vehicle has been parked and subjected to diurnal temperature changes over a period of several days, commonly called "diurnal breathing loss" (DBL) emissions. The California Low Emission Vehicle Regulations make it desirable for these DBL emissions from the canister system to be below 10 mg ("PZEV") for a number of vehicles beginning with the 2003 model year and below 50 mg, typically below 20 mg, ("LEV-II") for a larger number of vehicles beginning with the 2004 model year.

Now the California Low Emission Vehicle Regulation (LEV-III) and United States Federal Tier 3 regulations require canister DBL emissions not to exceed 20 mg as per the Bleed Emissions Test Procedure (BETP) as written in the California Evaporative Emissions Standards and Test Procedures for 2001 and Subsequent Model Motor Vehicles, Mar. 22, 2012. Furthermore, the regulations on DBL emissions continue to create challenges for the evaporative emission control systems, especially when the level of purge air is low. For example, the potential for DBL emissions may be more severe for a hybrid vehicle, including a vehicle whose powertrain is both an internal combustion engine and an electric motor ("HEV"), and a vehicle where there is a start-stop system that automatically shuts down and restarts the internal combustion engine to reduce the amount of time the engine spends idling, thereby reducing fuel consumption and tailpipe emissions.

In such hybrid vehicles, the internal combustion engine is turned off nearly half of the time during vehicle operation. Since the adsorbed fuel vapor on the adsorbents is purged only when the internal combustion engine is on, the adsorbents in the canister of a hybrid vehicle is purged with fresh air less than half of the time compared to conventional vehicles and frequently within the range of 55 BV to 100 BV, where "BV" is the ratio of the total volume of purge flow relative to the volumes of adsorbent in the canister system. And yet, hybrid vehicles can generate nearly the same amount of evaporative fuel vapor as conventional vehicles. The lower purge frequency and lower purge volume of the hybrid vehicle can be insufficient to clean the residue hydrocarbon heel from the adsorbents in the canister, resulting in high DBL emissions. Other powertrains when engineered for optimum drive performance, fuel efficiency and tailpipe emissions, are similarly challenged to provide a high level of purge for refreshing the canister and are challenged to provide optimum air-fuel mixtures and rates to the engine. These powertrains include turbocharged or turbo-assisted engines, start/stop, high-geared transmissions, and gasoline direct injection ("GDI") engines.

Globally, by contrast, evaporative emission regulations have been less stringent than in the US, but the trend is now for more stringent regulations, along the path that the US has taken. There is increased recognition of the benefits from tighter controls for better use of vehicle fuel and for cleaner air, especially in regions where light duty vehicle use is growing rapidly and air quality issues require urgent attention. As a notable example, the Ministry of Environmental Protection of the People's Republic of China released regulations in 2016 that include limitations on fuel vapor emissions, for implementation in 2020 (See "Limits and Measurement Methods for Emissions from Light-Duty Vehicles, GB 18352.6-2016, also known as "China 6"). This standard specifies the limits and measurement methods for light-duty vehicles, including hybrid electric vehicles, equipped with positive ignition engines for exhaust emissions in regular and low temperatures, real driving emissions (RDE), crankcase emissions, evaporative emissions and refueling emissions, technical requirements, and measurement methods of the durability for pollution control equipment, and onboard diagnostic system (OBD). Onboard refueling vapor recovery (ORVR) is required, in addition to evaporative emission control. Evaporative emissions are defined as the hydrocarbon vapors emitted from the fuel (gasoline) system of a motor vehicle, and includes: (1) fuel tank breathing losses (diurnal losses), which are hydrocarbon emissions caused by temperature changes in the fuel tank, and (2) hot soak losses, which are hydrocarbon emissions arising from the fuel system of a stationary vehicle after a period of driving. While the testing protocol and the emissions limits for the whole vehicle testing are provided in the regulations, there is leeway in the allocation by the vehicle manufacturers for the design limits of the components contributing to the total emissions (e.g., evaporative emission control canister system, fuel tank walls, hoses, tubing, etc.). Among the allocations, the limit for the evaporative emission control canister system is generally set in the fuel system and vehicle design processes to be less than 100 mg for the day 2 DBL emissions as part of the design balance for meeting the overall vehicle requirements of China 6 regulations.

Yet, in the face of the needs for high working capacity performance and for designing systems for fuel emissions within regulatory limits, there is a disproportionate increase in the bleed emissions performance as GWC performance and BWC properties are increased, as is well known in the art. See, e.g., SAE Technical Paper 2001-01-0733; and U.S. Pat. No. 6,540,815 at Table (comparative and inventive data for 11 BWC versus 15 BWC activated carbons.).

For satisfying the apparently opposing needs of high working capacity and low DBL emission performance, several approaches have been reported. One approach is to significantly increase the volume of purge gas to enhance desorption of the residue hydrocarbon heel from the adsorbent volume. See U.S. Pat. No. 4,894,072. This approach, however, has the drawback of complicating management of the fuel/air mixture to the engine during the purge step and tends to adversely affect tailpipe emissions, and such high levels of purge are simply unavailable for certain powertrain designs. Though at the cost of design and installation, an auxiliary pump may be employed at some location within the evaporative emission control system to supplement, assist, or augment the purge flow or volume, as a means to complement the engine vacuum and to avoid some issues with engine performance and tailpipe emission control when otherwise depending on the engine vacuum alone.

Another approach is to design the canister to have a relatively low cross-sectional area on the vent-side of the canister, either by the redesign of existing canister dimensions or by the installation of a supplemental vent-side canister of appropriate dimensions. This approach reduces the residual hydrocarbon heel by increasing the intensity of purge air. One drawback of such approach is that the relatively low cross-sectional area imparts an excessive flow restriction to the canister. See U.S. Pat. No. 5,957,114.

Another approach for increasing the purge efficiency is to heat the purge air, or a portion of the adsorbent volume having adsorbed fuel vapor, or both. However, this approach increases the complexity of control system management and poses some safety concerns. See U.S. Pat. Nos. 6,098,601 and 6,279,548.

Another approach is to route the fuel vapor through a fuel-side adsorbent volume, which is located proximal to the fuel source in the fluid stream, and then at least one subsequent (i.e., vent-side) adsorbent volume, which is located down-stream from the fuel-side adsorbent, prior to venting to the atmosphere, wherein the fuel-side adsorbent volume (herein, the initial adsorbent volume") has a higher isotherm slope, defined as an incremental adsorption capacity, than the subsequent (i.e., vent-side) adsorbent volume. See U.S. Pat. No. RE38,844. It is notable that U.S. RE38,844 considers the trade-off in DBL bleed emissions performance with BWC as an inevitable consequence of the high slope properties of the adsorption isotherms that are present with high BWC adsorbents according to the dynamics of vapor and adsorbate concentration gradients along the vapor flow path during adsorption, purge, and soak cycles. This approach has the drawback of requiring multiple adsorbent volumes in-series with varied properties for affording the low emissions, which increases system size, complexity, and cost for design and fabrication.

Another approach, especially useful when only a low level of purge might be available, is to route the fuel vapor through at least one subsequent (i.e., vent-side) adsorbent comprising a window of incremental adsorption capacity, BWC, a particular g-total BWC capacity, and substantially uniform structure that facilitates approximately uniform air and vapor flow distribution across its flow path cross section. See U.S. Pat. No. 9,732,649 and U.S. 2016/0271555A1.

Thus, the dilemma of excessive DBL bleed emissions for high working capacity carbons is recognized, and typically addressed by the addition of an auxiliary chamber comprising an additional adsorbent, e.g., an adsorbent volume having a relatively low BWC. See U.S. Pat. No. 9,657,691. However, one of the disadvantages to such a system, is the added cost of including the supplemental adsorbent volume. For example, manufacturing complexities limit production rates and duration.

Accordingly, it is desirable to have an evaporative emission control system that is as low cost, simple, and compact as possible for providing the needed low diurnal breathing loss (DBL) emissions even when a low level of purge air is used, or when the adsorbents in the canister are purged less frequently such as in the case of hybrid or start/stop vehicles, or both.

SUMMARY

Presently described is an adsorbent material that surprisingly and unexpectedly demonstrates desirable emissions performance when incorporated into vehicle emissions control canisters and, at the same time, confers certain manufacturing advantages as compared to conventional honeycomb adsorbents. For example, the described adsorbent material is lighter, and surprisingly can be extruded at a higher rate, and produces less wear on extrusion dies. Accordingly, the adsorbent material as described is less expensive to manufacture while functioning as good as or better than conventional adsorbent materials.

Thus, in one aspect the description provides an adsorbent composition comprising:

from about 10 to about 50 wt % of an activated adsorbent material;

from about 3 to about 40 wt % of glass microspheres; and the difference to 100 wt % with at least one additive material.

In any aspect or embodiment described herein, the additive material comprises at least one of organic binder, inorganic binder or a combination thereof. In any aspect or embodiment described herein, the organic binder is a cellulosic binder. In any aspect or embodiment described herein, the inorganic binder is at least one of a clay, silica or a combination of thereof. In certain embodiments, the silica comprises a silica sol material.

In any aspect or embodiment described herein, the description provides an adsorbent composition comprising:

from about 10 to about 50 wt % of an activated adsorbent material, for example, a material comprising or consisting essentially of an activated adsorbent powder;

from about 2 to about 10 wt % of an organic binder;

from about 2 to about 50 wt % of an inorganic binder (for example, at least one of a clay, silica or a combination thereof); and from about 3 to about 40 wt % of glass microspheres.

In any aspect or embodiment described herein, the description provides an adsorbent composition comprising from about 0 to about 5 wt % of a silica sol.

In an additional aspect, the description provides methods for preparing an extruded adsorbent composition according to the steps comprising: (a) admixing (i) from about 10 to about 50 wt % of an activated adsorbent material, e.g., an activated adsorbent composition comprising an activated adsorbent powder, (ii) from about 3 to about 40 wt % of glass microspheres, and (iii) the difference to 100 wt % with at least one additive material to form an adsorbent composition; and (b) extruding and optionally drying the adsorbent composition to produce an extruded adsorbent composition. In any aspect or embodiment, the additive material comprises at least one of organic binder, inorganic binder or a combination thereof. In any aspect or embodiment described herein, the organic binder is a cellulosic binder. In any aspect or embodiment described herein, the inorganic binder is at least one of a clay, silica or a combination of thereof. In certain embodiments, the silica comprises a silica sol material. In any of the described aspects or embodiments, a honeycomb die is used in the extruding step to produce an extruded adsorbent material having a honeycomb structure. In any of the aspects or embodiments described herein, the binder of the adsorbent composition or the extruded adsorbent composition produced as described herein comprises at least one of a clay binder, a calcined binder, mineral flux, water or a combination thereof. In any of the aspects or embodiments described herein, the adsorbent composition or the extruded adsorbent composition produced as described herein comprises from about 5 to about 50 wt % of a clay binder, from about 5 to about 45 wt % of a calcined binder, from about 2 to about 20 wt % of a mineral flux or a combination thereof.

In any of the described aspects or embodiments, the description provides an extruded adsorbent composition or article produced according to the steps comprising: (a) admixing (i) from about 10 to about 50 wt % of an activated adsorbent material, e.g., an activated adsorbent material comprising an activated adsorbent powder; (ii) from about 2 to about 10 wt % of an organic binder; (iii) from about 5 to about 50 wt % of a clay binder; (iv) from about 5 to about 45 wt % of a calcined clay binder; (v) from about 2 to about 20% of a mineral flux; (vi) from about 0 to about 5 wt % of a silica sol; and (vii) from about 3 to about 40 wt % of glass microspheres to form an adsorbent composition; and (b) extruding the adsorbent composition to form an extruded adsorbent composition or article. In certain embodiments, a honeycomb die is used in the extruding step to produce an extruded adsorbent composition having a honeycomb structure.

In any of the aspects or embodiments described herein, the extrudable adsorbent composition comprises from about 10 to about 50 wt % of an activated adsorbent material comprising an activated adsorbent powder; from about 2 to about 10 wt % of a polymeric organic binder; from about 5 to about 50 wt % of a clay binder; from about 5 to about 45 wt % of a calcined binder; from about 2 to about 20% of a mineral flux; from about 0 to about 5 wt % of a silica sol; and from about 3 to about 40 wt % of glass microspheres.

In any of the aspects or embodiments described herein, the extrudable adsorbent composition or extruded adsorbent article comprises a ratio of pore volumes of 0.05-1 micrometer to 0.05-100 micrometer as described herein that is greater than about 70%, or greater than about 75%, greater than about 80%, or greater than about 90%.

In any of the aspects or embodiments described herein, the extrudable adsorbent composition or extruded adsorbent article comprises a ratio of pore volumes of 0.05-0.5 micrometer to 0.05-100 micrometers as described herein that is greater than about 20%, 30%, 40%, 50%, 60%, 70%, 80%, or 90%.

In another aspect, the disclosure provides an evaporative emission control canister system comprising at least one fuel-side adsorbent volume and at least one vent-side adsorbent volume, wherein at least one of the at least one fuel-side or the at least one vent-side adsorbent volumes comprises the extruded adsorbent composition as described herein.

In any of the aspects or embodiments described herein, the canister system comprises one or more vent-side adsorbent volumes having a uniform cell structure, i.e., approximately all of the cells in the adsorbent volume are the same size.

In any of the aspects or embodiments described herein, the extruded adsorbent composition as described herein demonstrates two-day diurnal breathing loss (DBL) emissions of 100 mg or less, for examples from about 5 mg to about 100 mg at a specified amount of purge air volume applied after a 40 g/hr butane loading step as determined by the 2012 California Bleed Emissions Test Procedure (BETP).

In an additional aspect, the description provides methods for reducing fuel vapor emissions in an evaporative emission control system, the method comprising contacting the fuel vapor with an evaporative emission control system as described herein, comprising an extruded adsorbent composition as described herein.

The preceding general areas of utility are given by way of example only and are not intended to be limiting on the scope of the present disclosure and appended claims. Additional objects and advantages associated with the compositions, methods, and processes of the present invention will be appreciated by one of ordinary skill in the art in light of the instant claims, description, and examples. For example, the various aspects and embodiments of the invention may be utilized in numerous combinations, all of which are expressly contemplated by the present description. These additional advantages objects and embodiments are expressly included within the scope of the present invention. The publications and other materials used herein to illuminate the background of the invention, and in particular cases, to provide additional details respecting the practice, are incorporated by reference.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating an embodiment of the invention and are not to be construed as limiting the invention. Further objects, features and advantages of the invention will become apparent from the following detailed description taken in conjunction with the accompanying figures showing illustrative embodiments of the invention, in which.

DETAILED DESCRIPTION

Figure 1:
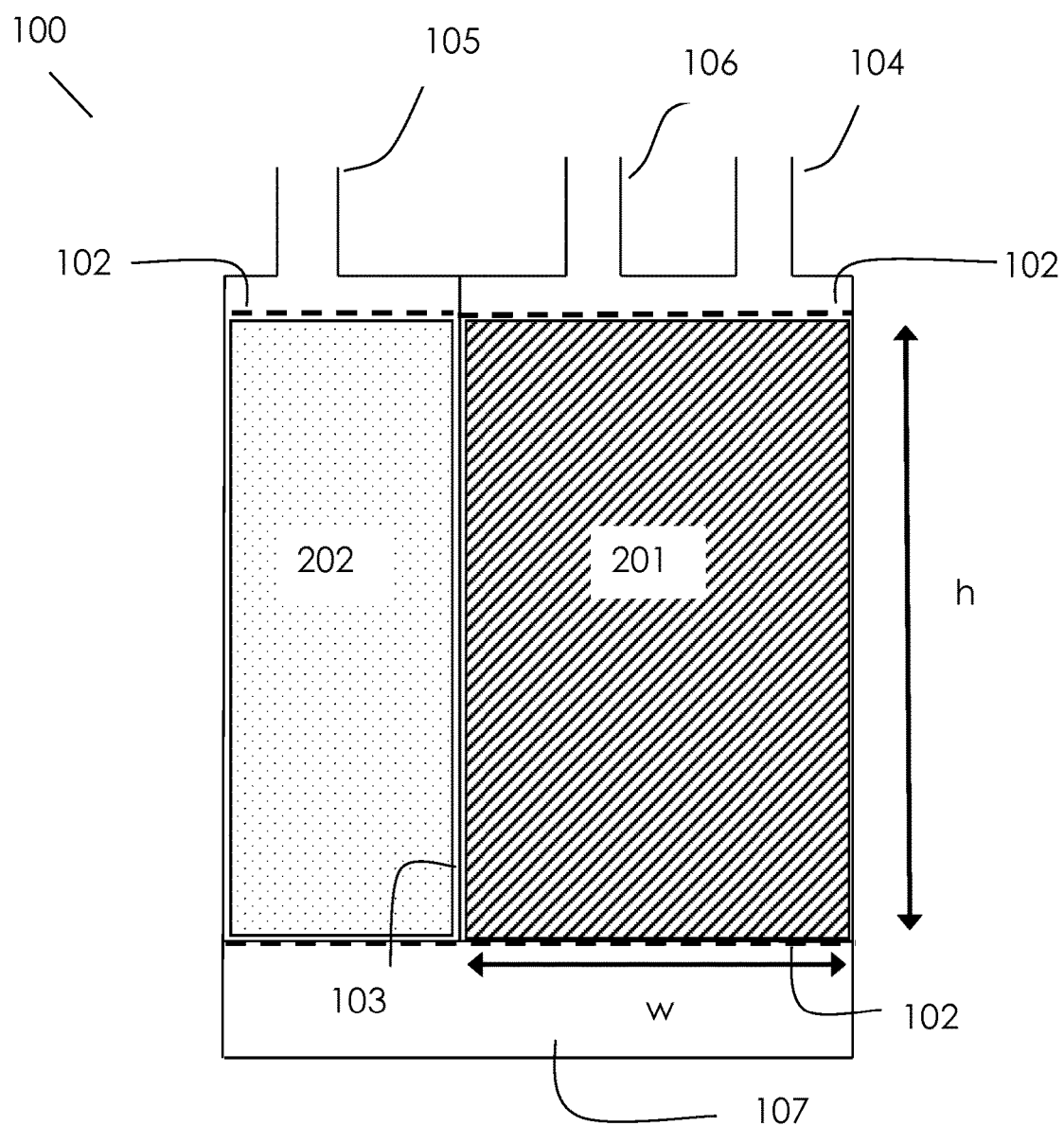
FIG. 1 is a cross-sectional view of an exemplary evaporative emission control canister system illustrating possible locations for where an adsorbent volume (such as a PPAV) as described herein may be utilized.

The present disclosure now will be described more fully hereinafter, but not all embodiments of the disclosure are shown. While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Elements common between figures may retain the same numerical designation.

Where a range of values is provided, it is understood that each intervening value between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

As used herein, the terms "fluid," "gas" or "gaseous" and "vapor" or "vaporous" are used in a general sense and, unless the context indicates otherwise, are intended to be interchangeable.

U.S. patent application Ser. No. 15/656,643 titled: Particulate Adsorbent Material and Methods of Making the Same, filed 21 Jul. 2017; U.S. Patent Publication US 2016/0271555A; U.S. Pat. Nos. 9,732,649; and 6,472,343 are hereby incorporated by reference in their entirety for all purposes.

Presently described is an adsorbent material that surprisingly and unexpectedly demonstrates desirable emissions performance when incorporated into conventional vehicle emissions control canisters and, at the same time, confers certain manufacturing advantages as compared to conventional honeycomb adsorbents. For example, the described adsorbent material is lighter, can be extruded at a higher rate, and produces less wear on extrusion dies. Accordingly, the adsorbent material as described is less expensive to manufacture.

Thus, in one aspect the description provides an adsorbent composition comprising:
  from about 10 to about 50 wt % of an activated adsorbent material;
  from about 3 to about 40 wt % of glass microspheres; and
  the difference to 100 wt % with at least one additive material.

In any aspect or embodiment described herein, the additive material comprises at least one of organic binder, inorganic binder, mineral flux or a combination thereof. In any aspect or embodiment described herein, the organic binder is a cellulosic binder.

In any aspect or embodiment described herein, the description provides an adsorbent composition comprising:
  from about 10 to about 50 wt % of an activated adsorbent material, for example, a material comprising or consisting essentially of an activated adsorbent powder;
  from about 2 to about 10 wt % of an organic binder;
  from about 2 to about 50 wt % of an inorganic binder (for example, at least one of a clay, silica or a combination thereof); and
  from about 3 to about 40 wt % of glass microspheres.

In any aspect or embodiment described herein, the description provides an adsorbent composition comprising from about 0 to about 5 wt % of a silica sol.

In any of the described aspects or embodiments, the inorganic binder of the adsorbent composition or the extruded adsorbent composition produced as described herein comprises at least one of a clay binder, a calcined binder, mineral flux, water or a combination thereof. In any aspect or embodiment described herein, the inorganic binder is at least one of a clay, silica or a combination of thereof. In certain embodiments, the silica comprises a silica sol material. In any of the aspects or embodiments described herein, the adsorbent composition or the extruded adsorbent composition produced as described herein comprises from about 5 to about 50 wt % of a clay binder, from about 5 to about 45 wt % of a calcined binder, from about 2 to about 20 wt % of a mineral flux or a combination thereof.

The adsorbent compositions and extruded adsorbent compositions as described herein adsorb volatile organic compounds and other chemical agents. As will be appreciated by the skilled artisan, a variety of adsorbent materials, e.g., activated carbon, can be used in this invention. The most suitable adsorbent material will depend on the intended application, particularly the nature of the volatile species to be adsorbed. Thus, the physical properties of the adsorbent compositions and extruded adsorbent compositions as described herein, such as the surface area and the pore structure, may vary depending on the application.

In any of the aspects or embodiments described herein, the activated adsorbent material includes activated carbon, carbon charcoal, zeolites, clays, porous polymers, porous alumina, porous silica, molecular sieves, kaolin, titania, ceria, and combinations thereof. In certain embodiments, the activated adsorbent material is an activated carbon. Activated carbon has been processed to make it highly porous (i.e., having a large number of pores per unit volume), which imparts a high surface area. Activated carbons may be generated from a variety of materials, however most commercially available activated carbons are made from peat, coal, lignite, wood, and coconut shells. Based on the source, the carbon can have different pore sizes, ash content, surface order, and/or impurity profiles. Coconut shell-based carbon has predominantly a microporous pore size, whereas a wood-based chemically activated carbon contains significant pore volume within the mesoporous size range. In a preferred embodiment, the activated adsorbent material comprises an activated carbon powder.

In any of the aspects or embodiments described herein, the activated adsorbent material precursor is wood. The activated adsorbent material precursor can be activated by heating the adsorbent material precursor and treating with added oxidizing agents, such as exogenously added activating (i.e. oxidizing) agents, such as carbon dioxide, oxygen, acids or superheated steam. An exemplary activated adsorbent material includes NUCHAR® (Ingevity South Carolina, LLC, SC), which is derived from wood and activated with phosphoric acid.

In any of the aspects or embodiments described herein, the adsorbent composition is extruded. In any of the aspects or embodiments described herein, the adsorbent composition includes from about 10 to about 50 wt % of an activated adsorbent material, or from about 10 to about 45 wt %, from about 10 to about 40 wt %, from about 10 to about 35 wt %, from about 10 to about 30 wt %, from about 10 to about 25 wt %, or from about 10 to about 20 wt %, or from about 15 to about 30 wt %, or from about 15 to about 25 wt %, or from about 15 to about 30 wt %, from about 15 to about 35 wt %, from about 15 to about 40 wt %, from about 15 to about 45 wt %, or from about 15 to about 50 wt %, each based on the total weight of the adsorbent composition.

In any of the aspects or embodiments described herein, the activated adsorbent material comprises activated carbon, carbon charcoal, zeolites, clays, porous polymers, foams, porous alumina, porous silica, molecular sieves, kaolin, titania, ceria, or combinations thereof. In any of the aspects or embodiments described herein, the adsorbent material is activated carbon. The activated adsorbent material can be derived from an activated adsorbent material precursor. By way of non-limiting example, the activated adsorbent material precursors may be wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables such as rice hull or straw, synthetic polymer, natural polymer, lignocellulosic material, or combinations thereof. Furthermore, activated adsorbent material may be produced using a variety of processes including, but are not limited to, chemical activation, thermal activation, or combinations thereof.

Generally, the larger the surface area of the activated adsorbent material, the greater its adsorption capacity. For example, the available surface area of activated carbon is dependent on its pore volume. Since the surface area per unit volume decreases as individual pore size increases, large surface area generally is maximized by maximizing the number of pores of very small dimensions and/or minimizing the number of pores of very large dimensions.

The Brunauer-Emmet-Teller (B.E.T.) surface area method can characterize the specific surface area of a material. Preferably, the activated adsorbent material has a nitrogen B.E.T. surface from about 600 to about 2000, from about 800 to about 1800, or from about 1000 to about 1600 m$^2$ per gram. Suitable activated carbon can also be characterized by having a particle size such that more than 40% by weight of the activated carbon passes through a 325 mesh screen, and more desirably, by having a particle size such that more than 65% by weight of the activated carbon passes through a 325 mesh screen.

In any aspect or embodiment described herein, the activated adsorbent powder, e.g., activated carbon powder, has a butane activity (pBACT) of at least about 50 g/100 g. In certain embodiments, the pBACT of the activated adsorbent precursor is at least about 50 g/100 g, 55 g/100 g, 60 g/100 g, 65 g/100 g, 70 g/100 g, 75 g/100 g, 80 g/100 g, 85 g/100 g, 90 g/100 g, 95 g/100 g or more including all values in between. In certain embodiments, the pBACT of the activated adsorbent powder, e.g., activated carbon powder, is from about 50 g/100 g to about 95 g/100 g, from about 50 g/100 g to about 90 g/100 g, from about 50 g/100 g to about 85 g/100 g, from about 50 g/100 g to about 80 g/100 g, from about 50 g/100 g to about 75 g/100 g, from about 50 g/100 g to about 70 g/100 g, from about 50 g/100 g to about 65 g/100 g, about 50 g/100 g to about 60 g/100 g, and including all overlapping ranges, subsumed ranges and values in between.

In any of the aspects or embodiments described herein, the adsorbent composition or extruded adsorbent composition comprises from about 2 to about 10 wt % of an organic binder. In any of the aspects or embodiments described herein, the organic binder comprises a polymeric binder. In any of the aspects or embodiments described herein, the polymeric binder is cellulosic, e.g., a cellulose, a cellulose derivative, or a combination thereof. In any of the aspects or embodiments described herein, the polymeric binder comprises at least one of carboxymethyl cellulose (CMC), methylcellulose, ethylcellulose, ethyl methyl cellulose, hydroxyethyl cellulose, hydroxypropyl cellulose (HPC), hydroxyethyl methyl cellulose (HEMC), hydroxypropyl methyl cellulose (HPMC), methyl hydroxyethyl cellulose, and ethyl hydroxyethyl cellulose or a combination thereof. In any of the aspects or embodiments described herein, the polymeric binder is a cellulose ether. In any of the aspects or embodiments described herein, the cellulose ether is a methyl hydroxyethylcellulose. In any of the aspects or embodiments described herein, the cellulose ether is sublimated during calcination of the adsorbent.

In any of the aspects or embodiments described herein, the binder can comprise any suitable binder generally known in the art or that becomes known. In any of the embodiments described herein, the adsorbent composition or extruded adsorbent composition can comprise a polymeric binder selected from nylon, polyacrylic, fluoropolymer (PVDF), Those of skill in the art will recognize that certain types of binders are particularly useful for microporous or nanoporous, monolithic carbonaceous articles, which are expressly contemplated herein. For example, in certain embodiments, the binder is at least one of methylcellulose, methylcellulose ether, hydroxybutylmethylcellulose, hydroxypropyl methylcellulose, sodium alginate, hydroxyethyl methylcellulose, carboxymethylcellulose (CMC) and its derivatives and its metal salts (e.g. sodium carboxymethylcellulose), Teflon, novolac phenolic resin, humic acid-derived sodium salt, guar gum cellulose, starch, lignin, polyvinyl alcohol, polyacrylic acid, styrene butadiene resins (SBR), phenolic resin, polystyrene acrylic acid resins, reaction products of polyacrylic acid with polyols selected from the group of glycerin, polyvinyl alcohol, lignin and hydroxyethylcellulose, as well as derivatives and mixtures thereof, crystalline salts of aromatic sulfonates, polyfurfuryl alcohol, etc. An alternative to aqueous binders is the use of certain non-solubilized, non-aqueous binders, such as clays, phenolic resins, polyacrylates, poly vinyl acetates, polyvinylidene chloride (PVDC), ultra-high molecular weight polyethylene (UHMWPE), etc. In certain embodiments, the non-aqueous binder of the present disclosure is at least one binder selected from the group consisting of a fluoropolymer (e.g. poly(vinylidene difluoride)), polytetrafluoroethylene, fluorinated ethylene propylene, or perfluoroalkoxy alkanes), a polyamide (e.g., Nylon-6,6' or Nylon-6), a polyamide, fibrillated cellulose, a high-performance plastic (e.g. polyphenylene sulfide), copolymer with a fluoropolymer, a copolymer with a polyamide, a copolymer with a polyimide, a copolymer with a high-performance plastic or a combination thereof.

In certain embodiments, the binder comprises thermosetting polymeric binders, hot-melt polymeric binders or a combination thereof. Thermosetting polymeric binders are compositions based on thermosetting resins which are liquid or solid at ambient temperature and in particular those of urea-formaldehyde, melamine-urea-formaldehyde or phenol-formaldehyde type, resins of melamine-urea-formaldehyde type being preferred as well as emulsions of thermosetting (co)polymers in the latex foam. Crosslinking agents can be incorporated in the mixture. Mention may be made, as example of crosslinking agents, of ammonium chloride. Hot-melt polymeric binders are generally solid at ambient temperature and are based on resins of hot-melt type. Use may also be made, as polymeric binders, of pitch, tar or any other known polymeric binder.

In any of the described aspects or embodiments, the adsorbent composition or extruded adsorbent composition can further comprise a polymer binder selected from phenolic resins, lignins, lignosulfonates, polyacrylates, poly vinyl acetates, polyvinyl alcohol (PVA), polyvinylidene chloride (PVDC), ultra-high molecular weight polyethylene (UHMWPE), etc., fluoropolymer, e.g., polyvinylidene difluoride (PVDF), polyvinylidene dichloride (PVDC), a polyamide (e.g., Nylon-6,6' or Nylon-6), a high-performance plastic (e.g. polyphenylene sulfide), polyketones, polysulfones, and liquid crystal polymers, copolymers with a fluoropolymer (e.g. poly(vinylidene difluoride)), polytetrafluoroethylene (PTFE), fluorinated ethylene propylene, or perfluoroalkoxy alkanes), copolymers with a polyamide (e.g., Nylon-6,6' or Nylon-6), a copolymer with a polyimide, a copolymer with a high-performance plastic (e.g. polyphenylene sulfide) or a combination thereof.

In any of the described aspects or embodiments, the adsorbent composition or extruded adsorbent composition as described herein is produced from polymeric binder crosslinking of a ground precursor activated carbon material, wherein the ground activated carbon material is in the form of a powder. For example, in certain embodiments, the extrudable composition as described herein is produced by taking a powdered activated carbon material and applying the crosslinking polymeric binder technology of U.S. Pat. No. 6,472,343.

In any of the aspects or embodiments described herein, the polymeric binder is included in an amount of about 1 wt %, about 2 wt %, about 3 wt %, about 4 wt %, about 5 wt %, about 6 wt %, about 7 wt %, about 8 wt %, about 9 wt %, or about 10 wt %, including all values and ranges in between, each based on the total weight of the adsorbent composition or extrudable adsorbent composition.

In any of the described aspects or embodiments, the amount of polymeric binder is less than about 10 wt %, for example from about 0.05 wt % to about 10 wt %, from about 0.1 wt % to about 10 wt %, from about 0.5 wt % to about 10 wt %, from about 1.0 wt % to about 10 wt %, from about 1.5 wt % to about 10 wt %, from about 2.0 wt % to about 10 wt %, from about 2.5 wt % to about 10 wt %, from about 3.0 wt % to about 10 wt %, from about 3.5 wt % to about 10 wt %, or from about 4.0 wt % to about 10 wt % including all values in between, each based on the total weight of the extrudable adsorbent composition. In any of the described aspects or embodiments, the polymeric binder is methyl hydroxyethyl cellulose and is present in an amount of less than about 10 wt %, for example from about 0.05 wt % to about 10 wt %, from about 0.1 wt % to about 10 wt %, from about 0.5 wt % to about 10 wt %, from about 1.0 wt % to about 10 wt %, from about 1.5 wt % to about 10 wt %, from about 2.0 wt % to about 10 wt %, from about 2.5 wt % to about 10 wt %, from about 3.0 wt % to about 10 wt %, from about 3.5 wt % to about 10 wt %, or from about 4.0 wt % to about 10 wt %, including all values in between, each based on the total weight of the adsorbent composition or extrudable adsorbent composition It was observed that at the claimed amount of polymeric binder, the resulting extruded materials provided surprisingly and unexpectedly advantageous BWC as well as relatively low DBL.

Conventional compositions include a substantial portion of moldable, inorganic binder material which is plastic in nature and thus, when mixed with liquid, can be molded or extruded into a shape and will maintain that shape through drying and firing. An example of a moldable, inorganic binder material used in conventional compositions is ball clay, such as commercially available OLD MINE #4 ball clay (available from Kentucky-Tennessee Clay Company of Mayfield, KY). However, undesirably, high loading of materials such as ball clay required in conventional compositions can cause increased wear on the extrusion dies, which can increase the production costs.

Advantageously, the adsorbent materials and compositions of the present disclosure minimize or eliminate the use of ball clay and therefore, decrease the wear on the extrusion die used in the extrusion process.

In any of the aspects or embodiments described herein, the adsorbent materials or compositions include an inorganic binder. In any of the aspects or embodiments described herein, the inorganic binder comprises or is a clay binder. In any of the aspects or embodiments described herein, the clay binder can include at least one of zeolite clay, bentonite clay, montmorillonite clay, illite clay, French green clay, pascalite clay, redmond clay, terramin clay, living clay, Fuller's Earth clay, ormalite clay, vitallite clay, rectorite clay, cordierite, ball clay, kaolin or a combination thereof. Preferably, the clay filler is a hydrous kaolin. Hydrous kaolin is characterized by its fine particle size, plate-like or lamellar particle shape and chemical inertness. In some embodiments, the clay filler excludes ball clay. An exemplary hydrous kaolin is Rogers Kaolin (commercially available from Imerys Kaolin, Inc).

In any of the aspects or embodiments described herein, the adsorbent composition includes from about 5 to about 50 wt % of a clay binder. In any of the aspects or embodiments described herein, the clay binder is relatively low in crystalline silica (e.g., less than about 5%). In any of the aspects or embodiments described herein, the amount of clay is minimized in order to reduce wear and prolong useful life of production equipment, e.g., extrusion dies.

In any of the aspects or embodiments described herein, the adsorbent composition or extruded adsorbent composition includes from about 5 to about 45 wt % of a calcined binder material, including for example, clay and/or silica sol. In any of the aspects or embodiments described herein, the calcined clay binder is a combination of fine and medium sized particles. In any of the aspects or embodiments described herein, the kaolin clay binder includes fine and medium sized calcined kaolin particles. For example, GLO-MAX® kaolin (Imerys Kaolin, Inc., GA) is a medium particle size calcined kaolin. Calcined binder materials can include calcined kyanite, mullite, cordierite, clay grog, silica, alumina, and other calcined or non-plastic refractory ceramic materials and combinations thereof. In any of the aspects or embodiments described herein, the calcined binder material includes calcined kaolin clay, e.g, GLO-MAX LL (Imerys Kaolin, Inc., GA).

In any of the aspects or embodiments described herein, The calcined binder material is present in the adsorbent composition or extrudable adsorbent composition in an amount of from about 5 to about 45 wt %, from about 5 to about 40 wt %, from about 5 to about 35 wt %, from about 5 to about 30 wt %, from about 5 to about 25 wt %, from about 2 to about 20 wt %, from about 2 to about 15 wt %, from about 2 to about 10 wt %, from about 2 to about 8 wt %, or from about 5 to about 10 wt %, each based on the total weight of the composition.

In any of the aspects or embodiments described herein, the adsorbent composition or extruded adsorbent composition includes from about 2 to about 20 wt % of a mineral flux. In certain embodiments, the mineral flux comprises a feldspar mineral. In certain embodiments, the mineral flux is nepheline syenite, a naturally occurring silica deficient sodium-potassium aluminosilicate, e.g., MINEX® (Covia Canada, Ltd., Ontario, CA). MINEX contains less than one tenth of one percent free crystalline silica.

In any of the aspects or embodiments described herein, the adsorbent composition or extrudable adsorbent composition includes from about 0 to about 5 wt % or an inorganic binder, such as for example, silica sol. In any of the described aspects or embodiments, the silica sol is sodium silicate which increases the strength of both the dry, but unfired extruded article and the fired extruded article, and acts as a flux material. In any of the described aspects or embodiments, the silica sol is present in an amount of from about 0 to about 5 wt %, from about 0 to about 4 wt %, from about 0 to about 3 wt %, from about 0 to about 2.5 wt %, from about 0 to about 2 wt %, from about 0 to about 1.5 wt %, or from about 0 to about 1.2 wt %, each based on the total weight of the adsorbent composition or extrudable adsorbent composition. A suitable commercially available silica sol is amorphous $SiO_2$ (e.g., Bindzil 2040 NH4 available from Akzo Nobel). In certain embodiments, the extrudable adsorbent composition excludes sodium silicate.

In any of the described aspects or embodiments, the adsorbent composition or extrudable adsorbent composition include glass microspheres. In certain embodiments, the glass microspheres are non-hollow or hollow glass microspheres (e.g., "glass bubbles)" which provide a further advantage in increasing the speed and ease of extrusion and providing a more cost-efficient process.

In any aspects or embodiments described herein, the glass microspheres of the adsorbent compositions or extrudable adsorbent compositions have an average diameter of less than about 500 micrometers, less than about 450 micrometers, less than about 400 micrometers, less than about 350 micrometers, less than about 300 micrometers, less than about 250 micrometers, less than about 200 micrometers, less than about 150 micrometers, less than about 100 micrometers, less than about 50 micrometers, less than about 40 micrometers, less than about 30 micrometers, less than about 25 micrometers, less than about 20 micrometers, less than about 15 micrometers less than about 10 micrometers, less than about 5 micrometers; or from about 10 micrometers to about 100 micrometers, from about 10 micrometers to about 50 micrometers, from about 10 micrometers to about 40 micrometers, from about 10 micrometers to about 30 micrometers, from about 10 micrometers to about 25 micrometers, or from 10 micrometers to about 20 micrometers.

In any of the aspects or embodiments, the glass microspheres are glass bubbles. "Glass bubbles" also commonly known as "glass microbubbles", "hollow glass microspheres", or "hollow glass beads" can be useful for lowering weight and improving processing, dimensional stability, and flow properties of compositions. Generally, it is desirable that the glass bubbles be strong to avoid being crushed or broken during extrusion. Useful hollow glass particles include those marketed by 3M Co. (St. Paul, Minn.) under the trade designation "3M GLASS BUBBLES" (e.g., grades—S32, K37, S38, S38HS, S38XHS, K46, D32/4500, H50/10000, S60, S60HS, and iM30K); glass bubbles marketed by Potters Industries, Valley Forge, Pa., (an affiliate of PQ Corporation) under the trade designations "Q-CEL HOLLOW SPHERES" and "SPHERICAL HOLLOW GLASS SPHERES" and hollow glass particles marketed by Silbrico Corp., Hodgkins, Ill. under the trade designation "SIL-CELL". Exemplary glass bubbles include soda-lime-borosilicate glass bubbles (hollow spheres) with medium particle diameter (18 μm), density 0.6 g/cc; crush strength (90% survival) of 27 k psi.

Glass microspheres can be useful for lowering weight and improving processing, dimensional stability, and flow properties of compositions. In certain embodiments, the glass microspheres are used as a filler and/or diluent, so as to minimize or eliminate the need for abrasive binders, e.g., ball clay. In certain embodiments, the glass microspheres reduce BWC.

In any of the aspects or embodiments described herein, the adsorbent composition or extrudable adsorbent composition comprises from about 10 to about 50 wt % activated adsorbent material (e.g., activated carbon), from about 2 to about 10 wt % polymeric binder, (e.g., methylcellulose, cellulose ether (METHOCEL)), from about 5 to about 10 wt % clay binder (e.g., Rogers kaolin), from about 5 to about 45 wt % of a calcined clay binder (e.g., GLOMAX LL), from about 2 to about 20 wt % mineral flux (e.g., MINEX, The Cary Company), from about 0 to about 5 wt % silica sol, and from about 5 to about 40 wt % glass microspheres (e.g., iM30K glass bubbles, 3M).

In an additional aspect, the description provides methods for preparing an extruded adsorbent composition according to the steps comprising: (a) admixing (i) from about 10 to about 50 wt % of an activated adsorbent material, e.g., an activated adsorbent composition comprising an activated adsorbent powder, (ii) from about 3 to about 40 wt % of glass microspheres, and (iii) the difference to 100 wt % with at least one additive material to form an adsorbent composition; and (b) extruding the adsorbent composition to produce an extruded adsorbent composition. In any aspect or embodiment, the additive material comprises at least one of organic binder, inorganic binder or a combination thereof. In any aspect or embodiment described herein, the organic binder is a cellulosic binder. In any aspect or embodiment described herein, the inorganic binder is at least one of a clay, silica or a combination of thereof. In certain embodiments, the silica comprises a silica sol material. In any of the described aspects or embodiments, a honeycomb die is used in the extruding step to produce an extruded adsorbent. material having a honeycomb structure.

As would be understood by the skilled artisan, the dry ingredients of the extruded adsorbent composition will be wetted to form a paste prior to extrusion and drying. As such, in any aspect or embodiment described herein, water is added to the components (i)-(ii) to form a wetted mass or paste prior to the extruding step (b).

In any of the aspects or embodiments described herein, the binder of the adsorbent composition or the extruded adsorbent composition produced as described herein comprises at least one of a clay binder, a calcined binder, mineral flux, water or a combination thereof. In any of the aspects or embodiments described herein, the adsorbent composition or the extruded adsorbent composition produced as described herein comprises from about 5 to about 50 wt % of a clay binder, from about 5 to about 45 wt % of a calcined binder, from about 2 to about 20 wt % of a mineral flux or a combination thereof.

In any of the described aspects or embodiments, the description provides an extruded adsorbent composition produced according to the steps comprising: (a) admixing (i) from about 10 to about 50 wt % of an activated adsorbent material, e.g., an activated adsorbent material comprising an activated adsorbent powder; (ii) from about 2 to about 10 wt % of an organic binder; (iii) from about 5 to about 50 wt % of a clay binder; (iv) from about 5 to about 45 wt % of a calcined clay binder; (v) from about 2 to about 20% of a mineral flux; (vi) from about 0 to about 5 wt % of a silica sol; and (vii) from about 3 to about 40 wt % of glass microspheres to form an adsorbent composition; and (b) extruding the adsorbent composition to form an extruded adsorbent composition. In certain embodiments, a honeycomb die is used in the extruding step to produce an extruded adsorbent composition having a honeycomb structure.

In any of the aspects or embodiments described herein, the extruded composition comprises from about 10 to about 50 wt % of an activated adsorbent material comprising an activated adsorbent powder; from about 2 to about 10 wt % of a polymeric organic binder; from about 5 to about 50 wt % of a clay binder; from about 5 to about 45 wt % of a calcined binder; from about 2 to about 20% of a mineral flux; from about 0 to about 5 wt % of a silica sol; and from about 3 to about 40 wt % of glass microspheres.

In any of the described aspects or embodiments, the described adsorbent composition or extrudable adsorbent composition can be extruded at a rate that is faster than conventional formulations. Attempts at faster extrusion with conventional formulations results in an increased temperature due to friction and the extruded part gets unworkably stiff. In any of the described aspects or embodiments, the adsorbent compositions as described herein can be extruded at least about 40% faster than the conventional formulation, which is (about 3.5 in/s).

In any of the aspects or embodiments described herein, the extrudable adsorbent composition or extruded adsorbent article comprises a ratio of pore volumes of 0.05-1 micrometer to 0.05-100 micrometer as described herein that is greater than about 70%, or greater than about 75%, greater than about 80%, or greater than about 90%.

In any of the aspects or embodiments described herein, the extrudable adsorbent composition or extruded adsorbent article comprises a ratio of pore volumes of 0.05-0.5 micrometer to 0.05-100 micrometers as described herein that is greater than about 20%, 30%, 40%, 50%, 60%, 70%, 80%, or 90%.

Different types of extruded adsorbent articles can be prepared from the adsorbent compositions or extrudable adsorbent compositions as described herein. These include (but are not limited to) granules, pellets (e.g., cylindrical pellets), spheres, sheets, ribbons, trilobes, and monoliths, including articles having parallel internal passageways extending therethrough (i.e., a parallel passage adsorbent volume or PPAV), such as e.g., a honeycomb, for example a uniform or non-uniform honeycomb. In principle, any desired shape of extruded article can be formed with a proper shaping device. So, shapes such as monoliths, blocks, and other modular forms are envisioned as well, including particulate media of uniform shape, particulate media of non-uniform shape, structured media of extruded form, structured media of wound form, structured media of folded form, structured media of pleated form, structured media of corrugated form, structured media of poured form, structured media of bonded form, non-wovens, wovens, sheet, paper, foam, hollow-cylinder, star, twisted spiral, asterisk, configured ribbons, and combinations thereof. Formulations as described herein are particularly useful for the extrusion of PPAVs, e.g., honeycomb-type adsorbent articles.

In another aspect, the disclosure provides an evaporative emission control canister system comprising at least one fuel-side adsorbent volume and at least one vent-side adsorbent volume, wherein at least one of the at least one fuel-side or the at least one vent-side adsorbent volumes comprises the adsorbent composition or extruded adsorbent article as described herein.

In any of the aspects or embodiments described herein, the evaporative emissions control canister system comprises one or more vent-side adsorbent volumes having a uniform cell structure, i.e., approximately all of the cells in the adsorbent volume are the same size.

In any of the aspects or embodiments described herein, the evaporative emission control canister system comprising a vent-side extruded adsorbent article as described herein demonstrates two-day diurnal breathing loss (DBL) emissions of 100 mg or less. In certain embodiments, the evaporative emission control canister system comprising a vent-side extruded adsorbent article as described herein demonstrates two-day diurnal breathing loss (DBL) emissions of 100, 90, 80, 70, 60, 50, 40, 30 or 20 mg or less.

In any of the aspects or embodiments described herein, the extruded adsorbent composition as described herein demonstrates two-day diurnal breathing loss (DBL) emissions of 100 mg or less, for examples from about 5 mg to about 100 mg at a specified amount of purge air volume applied after a 40 g/hr butane loading step as determined by the 2012 California Bleed Emissions Test Procedure (BETP). In any of the embodiments described herein, the evaporative emission control system may further comprise a heating unit.

In an additional aspect, the description provides methods for reducing fuel vapor emissions in an evaporative emission control system, the method comprising contacting the fuel vapor with an evaporative emission control system as described herein, comprising an extruded adsorbent article as described herein.

In certain additional embodiments, the adsorbent composition or extrudable adsorbent composition as described herein is formed into a structure comprising a matrix with approximately uniform cell or geometric structure, e.g., a honeycomb configuration, which permits or facilitates approximately uniform air or vapor flow distribution through the subsequent adsorbent volume. In further embodiments, the adsorbent material is formed into a structure that includes a combination of any of the foregoing.

The extruded adsorbent composition or article may include any one or more of the above features, which can be combined in any number of ways according to the present description, and are expressly contemplated herein.

In any of the aspects or embodiments described herein, the extruded adsorbent article, e.g., adsorbent honeycomb structure, is dried in a manner so as to prevent cracking of the structure. To alleviate cracking, the extruded honeycomb structure is dried so that water is removed at substantially the same rate throughout the extruded honeycomb structure. Preferred drying methods include vacuum drying, freeze drying, microwave drying, radio frequency (RF) drying, and humidity control drying. More conventional drying methods can be used to dry the extruded honeycomb structure of the present invention but are less practical commercially. Such conventional methods include dielectric drying and warm air drying with the monolith wrapped in plastic.

Vacuum drying of the extruded honeycomb structure includes placing the extruded monolith in a vacuum chamber initially having ambient room temperature and atmospheric pressure within the vacuum chamber, reducing the pressure within the vacuum chamber at a rate and to a level sufficient to quickly freeze the water in the extruded honeycomb structure, and maintaining a reduced pressure within the vacuum chamber for a time sufficient for the frozen water in the extruded honeycomb structure to sublime until the extruded honeycomb structure is dried. This drying cycle may be interrupted temporarily to remove the extruded honeycomb structure to another chamber after the extruded honeycomb structure has been frozen. Freezing of the water in the extruded honeycomb structure immobilizes the water and stabilizes the size and shape of the extruded honeycomb structure. The initial vacuum desirably is a deep vacuum to quickly and uniformly freeze the extruded honeycomb structure. The vacuum freezes the extruded honeycomb structure more uniformly than if the extruded honeycomb structure were frozen in a cold chamber at atmospheric pressure. After freezing, the extruded honeycomb structure may then be moved to a second chamber which does not require quite as deep a vacuum as the first chamber. Sublimation can be completed in this second chamber. Desirably, during vacuum drying, the pressure within the vacuum chamber is reduced, within about 1 minute, from atmospheric pressure to a pressure less than about 1 torr, and desirably within the range from 30 micrometers to 1 torr. Alternatively, this second chamber can be at atmospheric pressure and sub-freezing temperature and the frozen extruded honeycomb structure can be dried with recirculating dehumidified air.

Freeze drying of the extruded honeycomb structure is carried out in the same manner as vacuum drying except that the structure is flash frozen before being placed into a vacuum chamber for drying by sublimation. The wet extruded honeycomb structure is frozen by placing the wet extruded honeycomb structure in a super cold chamber cooled by liquid nitrogen or other means known by those skilled in the art. Alternatively, the extruded honeycomb structure may be flooded with or dipped into super cold liquid such as liquid nitrogen to freeze the extruded honeycomb structure.

During the drying stage of freeze drying or vacuum drying wherein the extruded honeycomb structure is subjected to a vacuum, the temperature of the extruded honeycomb structure may be varied by application of energy by radiation, conduction, convection, or RF or microwave energy independently during drying to enhance water removal. Vacuum levels similar to those used for vacuum drying are used. The temperature of the extruded honeycomb structure should be maintained at or below a maximum of 32° F. to avoid non-uniform water loss and cracking.

Humidity control drying of the wet extruded honeycomb extruded honeycomb structure includes placing the extruded wet extruded honeycomb structure in a chamber initially having a relative humidity within the chamber of at least 92 percent and gradually reducing the relative humidity within the chamber until the extruded honeycomb structure is dried. Desirably, the initial relative humidity level in the chamber should be 98 percent or higher. The humidity in the chamber can be lowered in stages to effect substantially uniform moisture loss throughout the extruded honeycomb structure during each drying stage. The humidity conditioned air is circulated through the drying chamber and the passages of the honeycomb extruded honeycomb structure to ensure a uniform rate of moisture removal throughout the extruded honeycomb structure. The temperature within the chamber may be varied to enhance the drying action.

In any of the described aspects or embodiments, after a drying step, the dried extruded honeycomb extruded honeycomb structure is fired or calcined at a temperature from about 500 to about 1150° C., or from about 1000 to about 1150° C., in a nitrogen or other non-oxidizing or slightly reducing atmosphere. The extruded honeycomb structure should be fired at a temperature sufficient to react the ceramic forming materials together to create a matrix for holding the activated carbon and maintaining the honeycomb shape of the extrusion. The bonds created by the firing should be sufficient to create a matrix having a strength able to withstand handling and use of the extruded honeycomb structure in intended applications such as in an ozone filter for a xerographic device, a fuel adsorber in an automobile air intake system, or a catalyst support. When used as a catalyst support, the extruded honeycomb structure of the present invention can be coated with conventional catalyst coatings using conventional coating methods. The relatively high surface area of the material forming the extruded honeycomb structure of the present invention makes it desirable as a catalyst support.

In any of the described aspects or embodiments, the extruded adsorbent article as described herein has a BWC that is 1 g/dL to about 10 g/dL. The components of the adsorbent compositions disclosed herein can work with a variety of mixing, shaping and heat treating equipment. Different mixing devices such as low shear mullers, medium shear paddle mixers and high shear pin mixers have been demonstrated to produce a material that is suitable for subsequent shaping. Shaping devices such as auger extruders, ram extruders, granulators, roller pelletizers, spheronizers, and tableting presses are suitable, depending on the applications. Drying and curing of the wet carbon bodies can be carried out at temperatures below 270° C. with a variety of different devices, such as a convection tray oven, a vibrating fluid bed dryer, and a rotary kiln. In contrast, higher temperatures of about 500-1200° C. can be used for thermal treatment of clay-bound and phenolic resin-bound carbons, usually using a rotary kiln.

In certain embodiments, the adsorbent compositions and articles described herein have a ratio of pore volumes of 0.05-1 micrometer to 0.05-100 micrometer that is greater than about 70%, greater than about 75%, or greater than about 80%, including all values in between. In certain embodiments, the ratio of pore volumes of 0.05-1 micrometer to 0.05-100 micrometer is about 70%, about 71%, about 72%, about 73%, about 74%, about 75%, about 76%, about 77%, about 78%, about 79%, or about 80 including all values in between. In certain embodiments, the ratio of pore volumes of 0.05-1 micrometer to 0.05-100 micrometer is from 70-80%, or 75-80%, and including all overlapping ranges, subsumed ranges and values in between.

In certain embodiments, the adsorbent materials and compositions described herein have a ratio of pore volumes of 0.05-0.5 micrometer to 0.05-100 micrometers that is less than about 90%, less than about 80%, less than about 75%, less than about 70%, less than about 65%, less than about 60%, less than about 55%, less than about 50%, or less than about 45%, less than about 40%, less than about 35%, less than about 30%, less than about 25%, less than about 20%, including all values in between. In certain embodiments, the ratio of pore volumes of 0.05-0.5 micrometer to 0.05-100 micrometers is about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% or more. In certain embodiments, the ratio of pore volumes of 0.05-0.5 micrometer to 0.05-100 micrometers is from about 20-90%, about 20-85%, about 20-80%, about 20-75%, about 20-70%, about 20-65%, about 20-60%, about 20-55%, about 20-50%, about 20-45%, about 20-40%, about 20-35%, about 20-30%, or about 20-25%, and including all overlapping ranges, subsumed ranges and values in between.

In certain embodiments, the extruded material further has at least one of: (i) a ratio of pore volumes of 0.05-1 micrometer to 0.05-100 micrometers that is as described herein, e.g., greater than about 70%, (ii) a ratio of pore volumes of 0.05-0.5 micrometer to 0.05-100 micrometers that is as described herein, e.g., greater than about 20%, or (iii) a combination thereof. In certain embodiments, the shaping step is performed by extrusion.

In certain additional embodiments, the method includes step (e) of drying, curing or calcining the extruded adsorbent composition or article. In certain embodiments the drying, curing or calcining step is performed for from about 30 minutes to about 20 hours. In certain embodiments, the drying curing or calcining step is performed for about 1, about 2, about 3, about 4, about 5, about 6, about 7, about 8, about 9, about 10, about 11, about 12, about 13, about 14, about 15, about 16, about 17, about 18, about 19, or about 20 hours, including all values in between. In certain embodiments, the drying, curing or calcining step is performed at a temperature ranging from about 100° C. to about 650° C. In certain embodiments, the drying, curing or calcining step is performed at a temperature of about 100° C., about 110° C., about 120° C., about 130° C., about 140° C., about 150° C., about 160° C., about 170° C., about 180° C., about 190° C., about 200° C., about 250° C., about 300° C., about 350° C., about 400° C., about 450° C., about 500° C., about 550° C., about 600° C., about 650° C., about 700° C., or about 750° C., or about 800° C., or about 850° C., or about 900° C., or about 950° C., or about 1000° C., or about 1050° C., or about 1100° C.

In certain aspects, the extruded adsorbent composition or article as described herein are included in a canister. When the extruded adsorbent composition or article is included in a canister system, the canister demonstrates two-day DBL bleed emissions performance (second day diurnal breathing loss (DBL) emissions) of about 100 mg or less, about 90 mg or less, about 80 mg or less, about 70 mg or less, about 60 mg or less, about 50 mg or less, about 40 mg or less, about 30 mg or less, about 20 mg or less, or about 10 mg or less at a specified volume of purge applied after a 40 g/hr butane loading step as determined by the 2012 BETP. In any aspect or embodiment, the extruded adsorbent composition or article is included in a canister system, the canister demonstrates two-day DBL bleed emissions performance (second day diurnal breathing loss (DBL) emissions) of about 100 mg or less, about 90 mg or less, about 80 mg or less, about 70 mg or less, about 60 mg or less, about 50 mg or less, about 40 mg or less, about 30 mg or less, about 20 mg or less, or about 10 mg or less. In any aspect or embodiments described herein, the system is purged with more than 315 L of purge applied after a 40 g/hr butane loading step as determined by the 2012 BETP, no more than about 315 liters (i.e., about 150 BV based on the nominal volume of the base canister) of purge applied after a 40 g/hr butane loading step as determined by the 2012 BETP, or with no more than 210 liters (i.e., 100 BV) of purge applied after a 40 g/hr butane loading step as determined by the 2012 BETP.

In certain embodiments, the amount of purge is more than about 150 bed volumes (BV), from about 25 BV to about 150 BV, from about 35 to about 150 BV, from about 40 BV to about 150 BV, from about 50 BV to about 150 BV, including all overlapping ranges and values in between. In additional embodiments, the amount of purge is from about 25 BV to about 140 BV, from about 25 BV to about 130 BV, from about 25 BV to about 120 BV, from about 25 BV to about 110 BV, from about 25 BV to about 100 BV, from about 25 BV to about 90 BV, from about 25 BV to about 80 BV, from about 25 BV to about 70 BV, from about 25 BV to about 60 BV, from about 25 BV to about 50 BV, and including all overlapping ranges and values in between. In certain embodiments, the above purge volumes are based on a 2.1 liter canister system.

In certain embodiments, the extruded adsorbent composition or article is included in a 2.1 liter canister as described herein has a two-day diurnal breathing loss (DBL) emissions of no more than 100 mg at sufficient purge volume applied after the 40 g/hr butane loading step. In certain embodiments, the extruded adsorbent composition or article is included in a 2.1 liter canister as described herein has a two-day diurnal breathing loss (DBL) emissions of no more than 100 mg at 150 bed volumes (BV) of purge applied after the 40 g/hr butane loading step, as determined by the 2012 California Bleed Emissions Test Procedure (BETP), or a DBL of no more than 90 mg at 150 bed volumes of purge applied after the 40 g/hr butane loading step, as determined by the 2012 BETP, or a DBL of no more than 80 mg at 150 bed volumes of purge applied after the 40 g/hr butane loading step, as determined by the 2012 BETP, or a DBL of no more than 70 mg at 150 bed volumes of purge applied after the 40 g/hr butane loading step, as determined by the 2012 BETP, or a DBL of no more than 60 mg at 150 bed volumes of purge applied after the 40 g/hr butane loading step, as determined by the 2012 BETP, or a DBL of no more than 50 mg at 150 bed volumes of purge applied after the 40 g/hr butane loading step, as determined by the 2012 BETP, or a DBL of no more than 40 mg at 150 bed volumes of purge applied after the 40 g/hr butane loading step, as determined by the 2012 BETP, or a DBL of no more than 30 mg at 150 bed volumes of purge applied after the 40 g/hr butane loading step, as determined by the 2012 BETP, or a DBL of no more than 20 mg at 150 bed volumes of purge applied after the 40 g/hr butane loading step, as determined by the 2012 BETP, including all values in between.

In certain aspects, the evaporative emission control canister system comprises at least one fuel-side adsorbent volume and at least one subsequent (i.e., vent-side) adsorbent volume, wherein at least one of the at least one fuel-side adsorbent volume or at least one subsequent adsorbent volume includes an extruded adsorbent composition or article as described herein.

In certain embodiments, the evaporative emission control canister system has a two-day diurnal breathing loss (DBL) emissions of no more than about 100 mg, no more than about 95 mg, no more than about 90 mg, no more than about 85 mg, no more than about 80 mg, no more than about 75 mg, no more than about 70 mg, no more than about 65 mg, no more than about 60 mg, no more than about 55 mg, no more than about 50 mg, no more than about 45 mg, no more than about 40 mg, no more than about 35 mg, no more than about 30 mg, no more than about 25 mg, no more than about 20 mg, no more than about 15 mg or no more than about 10 mg at a specified purge volume after a 40 g/hr butane loading step as determined by the 2012 California Bleed Emissions Test. In certain embodiments, the purge volume is no more than about 315 liters, no more than about 310 liters, no more than about 300 liters, no more than about 290 liters, no more than about 280 liters, no more than about 270 liters, no more than about 260 liters, no more than about 250 liters, no more than about 240 liters, no more than about 230 liters, no more than about 220 liters, no more than about 210 liters, no more than about 200 liters, no more than about 190 liters, no more than about 180 liters, no more than about 170 liters, no more than about 160 liters, no more than about 150 liters, no more than about 140 liters, no more than about 130 liters, no more than about 120 liters, no more than about 110 liters, no more than about 100 liters, no more than about 90 liters, or no more than about 80 liters of purge applied after a 40 g/hr butane loading step as determined by the 2012 California Bleed Emissions Test. In certain embodiments, the amount of purge volume providing the above two-day DBL emissions as determined by the 2012 BETP is from about 50 liters to about 315 liters, from about 75 liters to about 315 liters, from about 100 liters to about 315 liters, from about 125 liters to about 315 liters, from about 150 liters to about 315 liters, from about 175 liters to about 315 liters, from about 200 liters to about 315 liters, from about 210 liters to about 315 liters, from about 220 liters to about 315 liters, from about 230 liters to about 315 liters, from about 240 liters to about 315 liters, or from about 250 liters to about 315 liters, including all values and ranges overlapping, subsumed, and in between.

In certain embodiments, the evaporative emission control canister system has a two-day diurnal breathing loss (DBL) emissions of no more than about 100 mg, no more than about 95 mg, no more than about 90 mg, no more than about 85 mg, no more than about 80 mg, no more than about 75 mg, no more than about 70 mg, no more than about 65 mg, no more than about 60 mg, no more than about 55 mg, no more than about 50 mg, no more than about 45 mg, no more than about 40 mg, no more than about 35 mg, no more than about 30 mg, no more than about 25 mg, no more than about 20 mg, no more than about 15 mg or no more than about 10 mg at no more at no more than about 150 BV, no more than about 145 BV, no more than about 140 BV, no more than about 135 BV, no more than about 130 BV, no more than about 125 BV, no more than about 120 BV, no more than about 115 BV, no more than about 110 BV, no more than about 105 BV, no more than about 100 BV, no more than about 95 BV, no more than about 90 BV, no more than about 85 BV, no more than about 80 BV, no more than about 75 BV, no more than about 70 BV, no more than about 65 BV, no more than about 60 BV, no more than about 55 BV, no more than about 50 BV, no more than about 45 BV, or no more than about 40 BV of purge applied after a 40 g/hr butane loading step as determined by the 2012 California Bleed Emissions Test.

The term "fuel-side adsorbent volume" is used in reference to a volume of adsorbent material that is proximal to the fuel vapor source, and therefore, earlier in the fuel vapor flow path relative to a subsequent adsorbent volume, which is necessarily positioned closer to the vent port (herein, a "vent-side adsorbent volume"). As the skilled artisan would appreciate, during a purge cycle, a vent-side or subsequent adsorbent volume(s) is contacted earlier in the purge air flow path. For convenience, the fuel-side adsorbent may be referred to as the "initial adsorbent volume" because it is positioned upstream in the fuel vapor flow path relative to the vent-side or subsequent adsorbent volume but the initial adsorbent volume is not necessarily required to be the first adsorbent volume in the canister.

Figure 2:
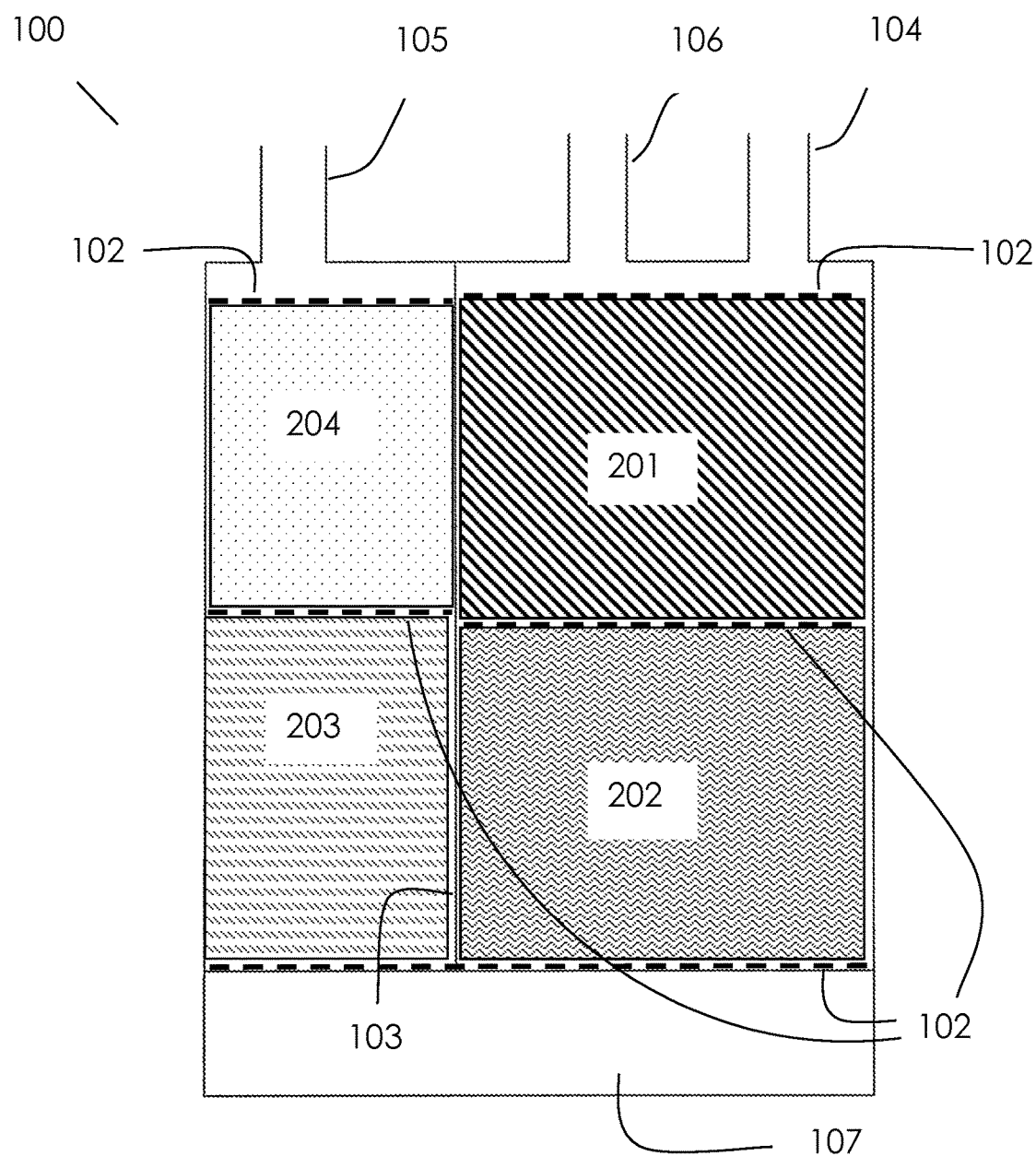
FIG. 2 is a cross-sectional view of an exemplary evaporative emission control canister system illustrating additional possible locations for where an adsorbent volume (such as a PPAV) as described herein may be utilized.

FIG. 1 illustrates one embodiment of the evaporative emission control canister system 100 having an adsorbent volumes in-series within a single canister 101. Canister system 100 includes screens or foams 102, a dividing wall 103, a fuel vapor inlet 104 from a fuel tank, a vent port 105 opening to an atmosphere, a purge outlet 106 to an engine, the fuel-side or initial adsorbent volume 201, and vent-side or subsequent adsorbent volume 202. The screens or foams 102 provide containment and support of the adsorbent volumes, as well as serve to as a distributor, to even the distribution of vapor flow into the adsorbent volumes. The two chambers containing the adsorbent volumes 201 and 202 are separated by the dividing wall 103 and connected for sequential vapor flow below a support screen 102 by way of the passage 107, called the canister plenum. When an engine is off, the fuel vapor from a fuel tank enters the canister system 100 through the fuel vapor inlet 104. The fuel vapor diffuses or flows into the fuel-side or initial adsorbent volume 201, and then the vent-side or subsequent adsorbent volume 202, which together define an air and vapor flow path, before being released to the atmosphere through the vent port 105 of the canister system. Once the engine is turned on, ambient air is drawn into the canister system 100 through the vent port 105. The purge air flows through volumes 202 in the canister 101, and finally through the fuel-side or initial adsorbent volume 201. This purge flow desorbs the fuel vapor adsorbed on the adsorbent volumes 201 through 202, before entering an internal combustion engine through the purge outlet 106. In any of the embodiments of the evaporative emission control canister system described herein, the canister system may include more than one vent-side or subsequent adsorbent volume. For example, the vent-side adsorbent volume 201 may have an additional or a plurality of vent-side adsorbent volumes 202 before the support screen 102 above the plenum 107, as shown in FIG. 2. Additional vent-side adsorbent volumes 203 and 204 may be found on the other side of the dividing wall.

Figure 3:
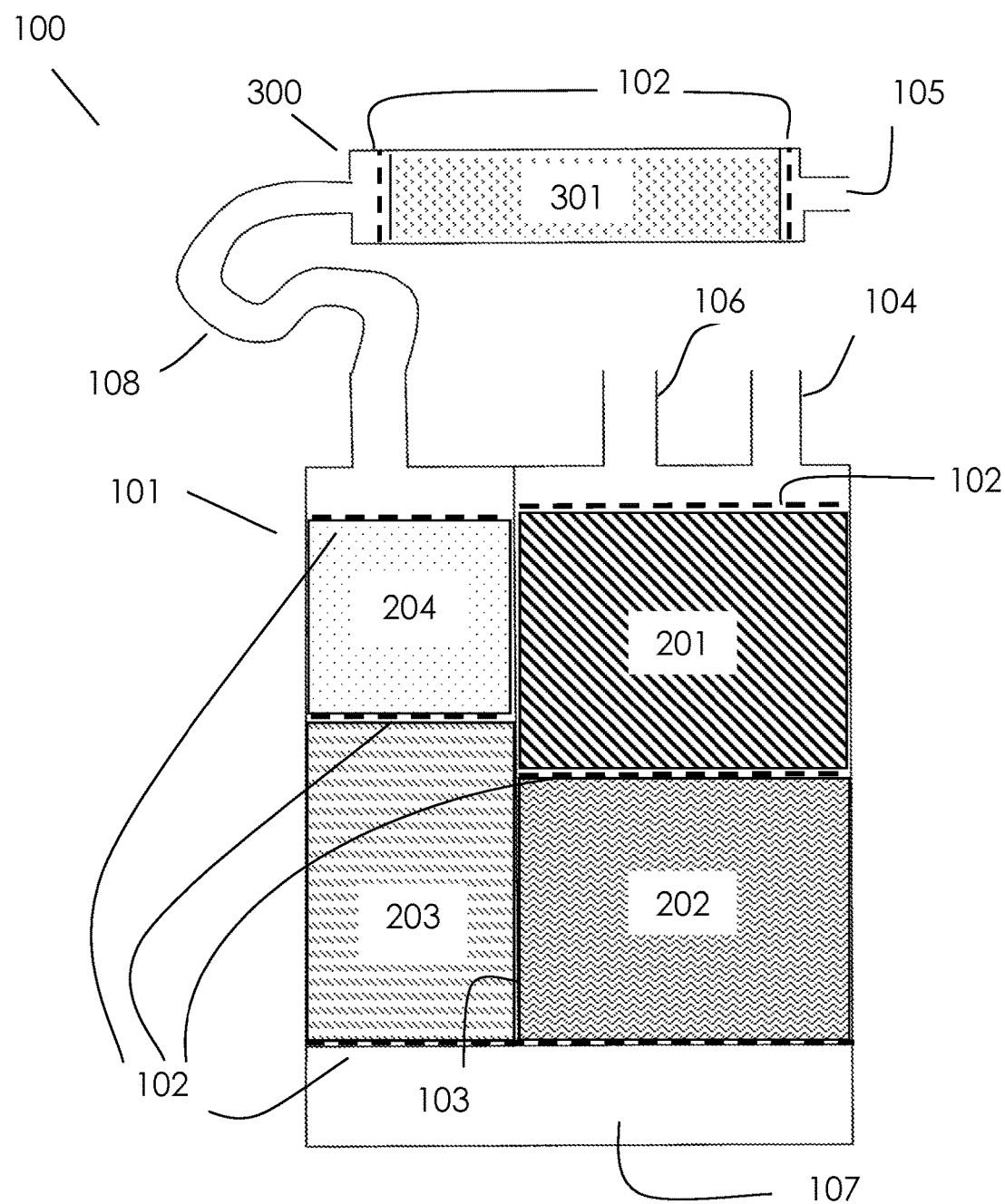
FIG. 3 is a cross-sectional view of an exemplary evaporative emission control canister system illustrating possible locations for where an adsorbent volume (such as a PPAV) as described herein may be utilized.
Figure 4:
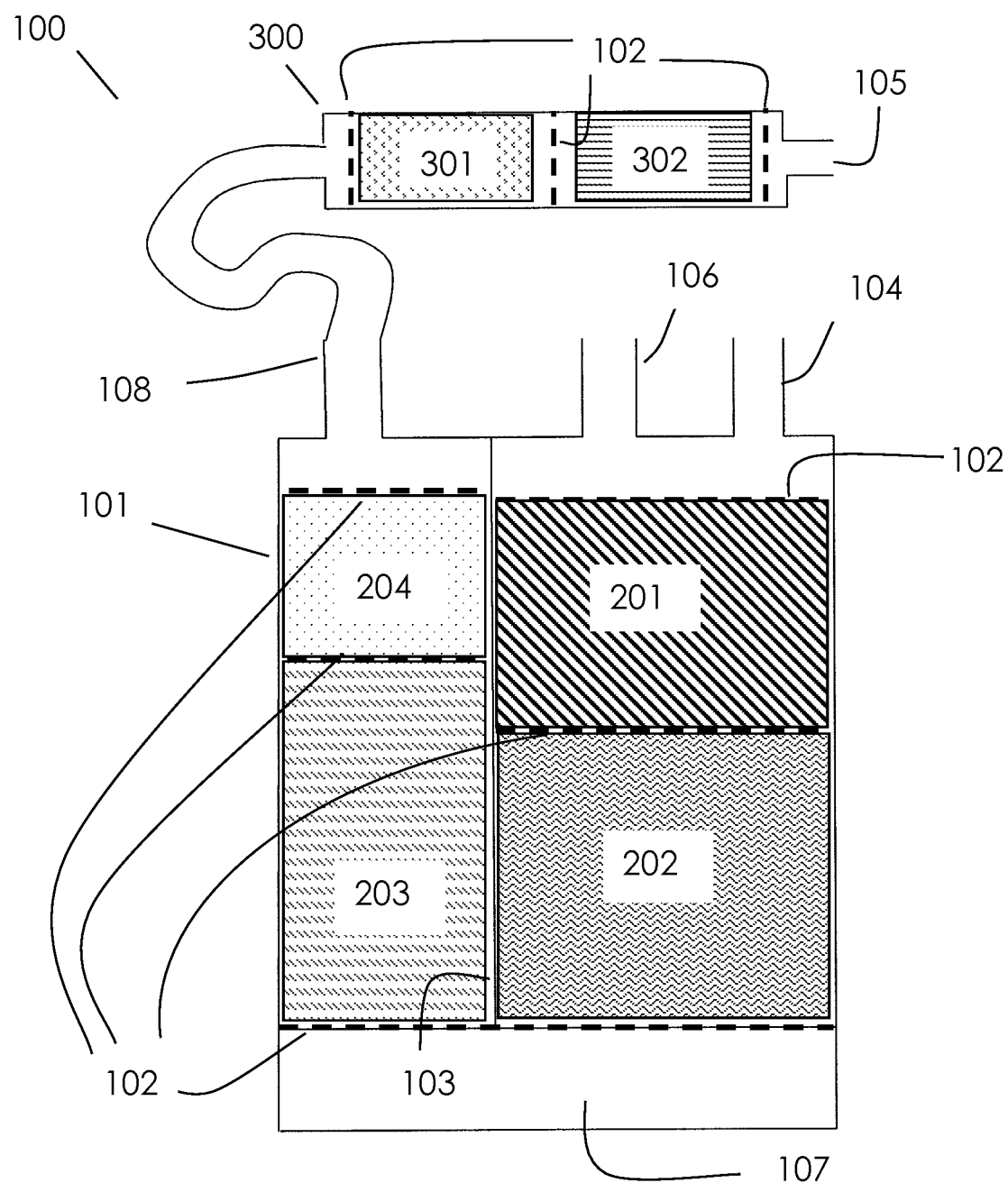
FIG. 4 is a cross-sectional view of an exemplary evaporative emission control canister system illustrating possible locations for where an adsorbent volume (such as a PPAV) as described herein may be utilized.

Furthermore, in still additional embodiments, the canister system may include more than one type of vent-side adsorbent volume, which can be independently selected, and/or which is comprised in one or more containers. For example, as shown in FIG. 3, an auxiliary chamber 300 containing a vent-side adsorbent volume 301 may be in-series in terms of air and vapor flow with the main canister 101 containing multiple adsorbent volumes, connected for vapor flow by way of a connecting hose or snorkel 108. As shown in FIG. 4, the auxiliary chamber 300 may contain two vent-side adsorbent volumes in-series 301 and 302. The adsorbent volumes 301 and 302 may also be contained within in-series chambers or auxiliary canisters, rather than the single chamber 300 of FIG. 4.

In any of the embodiments described herein, the evaporative emission control system may further comprise a heating unit or a means to add heat through electrical resistance or heat conduction.

In any of the aspects or embodiments described herein, the canister system comprises one or more vent-side adsorbent volumes having a uniform cell structure at or near the end of the fuel vapor flow path.

In certain embodiments, the at least one fuel-side or initial adsorbent volume and the at least one vent-side or subsequent adsorbent volume (or volumes) are in vaporous or gaseous communication and define an air and vapor flow path therethrough. The air and vapor flow path permits or facilitates directional air or vapor flow or diffusion between the respective adsorbent volumes in the canister system. For example, the air and vapor flow path facilitates the flow or diffusion of fuel vapor from the at least one fuel-side or initial adsorbent volume to the at least one vent-side or subsequent adsorbent volume (or volumes).

In any of the embodiments described herein, the at least one fuel-side or initial adsorbent volume and the at least one vent-side or subsequent adsorbent volume(s) may be located within a single canister, separate canisters or a combination of both. For example, in certain embodiments, the system comprises a canister comprising a fuel-side or initial adsorbent volume, and one or more vent-side or subsequent adsorbent volumes, wherein the vent-side or subsequent adsorbent volumes are connected to the fuel-side initial adsorbent volume such that they are in vaporous or gaseous communication forming a vapor flow path, and allowing air and/or vapor to flow or diffuse therethrough. In certain aspects, the canister permits sequential contact of the adsorbent volumes by air or fuel vapor.

In additional embodiments, the system comprises a canister comprising an initial adsorbent volume, and one or more subsequent adsorbent volumes connected to one or more separate canisters comprising at least one additional subsequent adsorbent volume, wherein the subsequent adsorbent volumes are connected to the initial adsorbent volume such that they are in vaporous or gaseous communication forming a vapor flow path, and allowing air and/or fuel vapor to flow or diffuse therethrough.

In certain embodiments, the system comprises a canister comprising a fuel-side or an initial adsorbent volume, and one or more vent-side or subsequent adsorbent volumes connected to one or more separate canisters comprising at least one additional subsequent adsorbent volume, wherein the one or more vent-side adsorbent volume and the at least one additional subsequent adsorbent volume are connected to the initial adsorbent volume such that they are in vaporous or gaseous communication forming a vapor flow path, and allowing air and/or fuel vapor to flow or diffuse therethrough, wherein at least one of the adsorbent volumes in the system is a extruded adsorbent material as described herein having an BWC of from about 1 g/dL to about 10 g/dL.

In certain embodiments, the system comprises a canister comprising a fuel-side or initial adsorbent volume, and one or more vent-side or subsequent adsorbent volumes connected to one or more separate canisters comprising at least one additional subsequent adsorbent volume, wherein the one or more vent-side adsorbent volume and the at least one additional subsequent adsorbent volume connected to the fuel-side initial adsorbent volume such that they are in vaporous or gaseous communication forming a vapor flow path, and allowing air and/or fuel vapor to flow or diffuse therethrough, wherein at least one of the adsorbent volumes in the system is a extruded adsorbent material as described herein.

In any of the aspects or embodiments described herein, the fuel-side or initial adsorbent volume is the first and/or second adsorbent volume, as such, the vent-side or subsequent adsorbent volumes are those downstream in the fluid flow path towards the vent port whether in the same or a separate canister or both.

In any aspects or embodiments described herein, the canister system comprises at least one extruded adsorbent volume as described herein as a vent-side adsorbent volume having at least one of: (i) an effective incremental adsorption capacity at 25° C. of from 1 gram n-butane/L to less than 35 grams n-butane/L between vapor concentrations of 5 vol % and 50 vol % n-butane, (ii) an BWC of less than 3 g/dL, (iii) a g-total BWC of less than 20 grams, or (iv) a combination thereof. In certain embodiments, the canister comprises at least one vent-side adsorbent material as described herein having an incremental adsorption capacity at 25° C. of about 35, about 34, about 33, about 32, about 31, about 30, about 29, about 28, about 37, about 36, about 35, about 34 about 23, about 22, about 21, about 20, about 19, about 18, about 17, about 16, about 15, about 14, about 13, about 12, about 11, about 10, about 9, about 8, about 7, about 6, about 5, about 4, about 3, about 2, or about 1 g/L between vapor concentrations of 5 vol % and 50 vol % n-butane.

In any of the aspects or embodiments described herein, the canister system comprises at least one fuel-side adsorbent volume having an effective incremental adsorption capacity at 25° C. of greater than about 35 grams n-butane per liter (g/L) to about 90 g/L between vapor concentration of 5 vol % and 50 vol % n-butane, or about 36, about 37, about 38, about 39, about 40, about 41, about 42, about 43, about 44, about 45, about 46, about 47, about 48, about 49, about 50, about 51, about 52, about 53, about 54, about 55, about 60, about 65, about 70, about 75, about 80, about 85, about 90 or more grams n-butane per liter (g/L) between vapor concentration of 5 vol % and 50 vol % n-butane. In any of the aspects or embodiments described herein, the canister system comprises at least one fuel-side adsorbent volume having an effective incremental adsorption capacity at 25° C. of greater than about 35, 40, 45, 50, 55, 60, 65, 70, 75, 80, 85, 90 or more grams n-butane per liter (g/L) to about 90 g/L between vapor concentration of 5 vol % and 50 vol % n-butane.

In any aspects or embodiments described herein, the canister system comprises at least one vent-side adsorbent material as described herein having an effective incremental adsorption capacity at 25° C. of less than about 35 grams n-butane per liter (g/L) between vapor concentration of 5 vol % and 50 vol % n-butane, or about 34, about 33, about 32, about 31, about 30, about 19, about 18, about 17, about 16, about 15, about 14, about 13, about 12, about 11, about 10, about 9, about 8, about 7, about 6, about 5, about 4, about 3, about 2, or about 1 grams n-butane per liter (g/L) between vapor concentration of 5 vol % and 50 vol % n-butane.

In a particular embodiment, the evaporative emission control system include: a fuel tank for storing fuel; an engine having an air induction system and adapted to consume the fuel; an evaporative emission control canister system comprising one or more canister(s); a fuel vapor inlet conduit from the fuel tank to the canister system; a fuel vapor purge conduit from the canister system to the air induction system of the engine; and a vent conduit for venting the canister system when the engine is off and for admission of purge air to the canister system when the engine is on. The evaporative emission control canister system is defined by a fuel vapor flow path from the fuel vapor inlet conduit to the initial adsorbent volume toward the at least one subsequent adsorbent volume and the vent conduit, and by an air flow path from the vent conduit to the at least one subsequent adsorbent volume toward the initial adsorbent volume and the fuel vapor purge conduit. In certain embodiments, the initial adsorbent volume and the at least one subsequent adsorbent volume are located within a single canister, or the initial adsorbent volume and the at least one subsequent adsorbent volume are located in separate canisters that are connected to permit sequential contact by fuel vapor. In certain embodiments, the evaporative emission control canister system has a two-day diurnal breathing loss (DBL) emissions of no more than 20 mg at sufficient purge air volume applied after the 40 g/hr butane loading step.

The disclosed evaporative emission control system may provide low diurnal breathing loss (DBL) emissions even under a low purge condition. The evaporative emission performance of the disclosed evaporative emission control system may be within the regulation limits defined by the California Bleed Emissions Test Procedure (BETP), which is 20 mg or less, even under a low purge condition.

The term "low purge," as used herein, refers to a purge level at or below 210 liters applied after the 40 g/hr butane loading step (i.e., 100 bed volumes for a 2.1 liter adsorbent component system).

The evaporative emission control system may provide low diurnal breathing loss (DBL) emissions even when being purged at or below 210 liters applied after the 40 g/hr butane loading step. In some embodiments, the evaporative emission control system may be purged at or below 157.5 liters applied after the 40 g/hr butane loading step.

In additional aspects, the adsorbent composition or extruded adsorbent composition as described herein is incorporated into a fluid separation system. In any aspect or embodiment, the fluid separation system includes any gas or liquid phase separation or purification application that utilizes a shaped adsorbent, such as granule, pellet, monolith or honeycomb. For example, by way of non-limiting example, the adsorbent composition or extruded adsorbent composition as described herein is incorporated into a system to purify air or other gases, such as hydrocarbon (e.g., methane, natural gas, propane, butane, ethylene, solvents), and non-hydrocarbons (e.g., hydrogen, nitrogen, oxygen, carbon dioxide, noble gases), and water, non-aqueous process and non-process liquids.

EXAMPLES

Unless specifically indicated otherwise, the amount of each component is in weight percent (wt %), based on the total weight of the composition.

TABLE 1

Exemplary formulations of adsorbent compositions.

| Component | Unit | E1 | E2 | E3 | E4 | E5 | E6 | E7 | E8 | E9 | E10 | C1 | C2 |
|---|---|---|---|---|---|---|---|---|---|---|---|---|---|
| Adsorbent | wt % | 16.0 | 18.0 | 20.0 | 12.0 | 29.0 | 44.0 | 36.8 | 12.0 | 20.0 | 12.0 | N/A | N/A |
| Glass Microspheres | wt % | 25.3 | 24.7 | 24 | 6.7 | 21.4 | 15.5 | 3.5 | 40 | 36 | 26.6 | 0 | 0 |
| Additives | wt % | 58.6 | 57.4 | 56 | 81.3 | 49.5 | 40.5 | 59.7 | 48.1 | 44 | 61.4 | N/A | N/A |
| Total | wt % | 100 | 100 | 100 | 100 | 100 | 100 | 100 | 100 | 100 | 100 | 100 | 100 |
| Pore Volume Ratio 0.05-1 μm to 0.05-100 μm | % | 89 | 88 | 85 | 87 | 90 | 85 | 87 | 85 | 76 | 83 | 90 | 93 |
| Pore Volume Ratio 0.05-0.5 μm to 0.05-100 μm | % | 64 | 63 | 37 | 86 | 40 | 54 | 86 | 29 | 19 | 50 | 89 | 92 |
| BACT* | g/100 g | 8.05 | 8.14 | 9.38 | 5.99 | 12.81 | 19.61 | 14.10 | 5.63 | 9.16 | 5.74 | 4.53 | 13.16 |
| BWC* | g/dL | 2.22 | 2.36 | 2.43 | 2.24 | 2.95 | 3.88 | 4.19 | 1.50 | 2.10 | 1.84 | 2.15 | 4.21 |
| AD* | g/mL | 0.304 | 0.320 | 0.294 | 0.401 | 0.251 | 0.230 | 0.300 | 0.269 | 0.248 | 0.337 | 0.499 | 0.379 |
| BPR* | % | 90.6 | 90.6 | 88.2 | 93.3 | 91.8 | 86.2 | 99.2 | 99.1 | 92.5 | 95.3 | 95.5 | 84.5 |

*Measured on 29 × 100-200 parts

The formulations E1-E10 in Table 1 were prepared by mixing the dry ingredients in a plow mixer followed by addition of liquid ingredients and sufficient water to make an extrudable paste. Once all ingredients are present, further mixing in the plow mixer is used to ensure dispersion of all ingredients. The resulting wet mixture was then intensively mixed in a sigma blade mixer or in a single screw extruder or kneader with extrusion through a multi-hole die plate to form a paste. The paste was then extruded through a single screw extruder equipped with a honeycomb die. The extruded parts were rough cut for drying and calcination in inert atmosphere to high temperature followed by cutting to exact length for testing. C1 and C2 are the formulation for commercially available honeycombs Nuchar® HCA-LBE and Nuchar HCA® (Ingevity®, North Charleston, SC, USA), respectively. Neither of these formulations contain glass microspheres.

Determination of Apparent Density, BWC, and Powder Butane Activity

The standard method ASTM D 2854 (hereinafter "the Standard Method") may be used to determine the nominal volume apparent density of particulate adsorbents, such as granular and pelletized adsorbents of the size and shape typically used for evaporative emission control for fuel systems.

The standard method ASTM D5228 may be used to determine the nominal volume butane working capacity (BWC) of the adsorbent volumes containing particulate granular and/or pelletized adsorbents. The butane retentivity is calculated as the difference, in units of g/dL, between the volumetric butane activity (i.e., the g/cc apparent density multiplied by the g/100 g butane activity) and the g/dL BWC.

For powdered activated carbon ingredients for extrusion, a powder butane activity ("pBACT") may be measured by any method known to those of skill in the art recognized as equivalent for ascertaining that value, i.e., the equilibrated gram weight capacity of the oven dried powder sample when exposed to 1.00 atm partial pressure of n-butane, for the sample thermostatted at 25° C. One suitable alternative for pBACT, for example, is based on the ASTM 5228 method, as described in US 2019/0226426A1, which is incorporated herein by reference.

A modified version of ASTM D5228 method may be used to determine the nominal volume butane working capacity (BWC) of the particulate, honeycomb, monolith, and/or sheet adsorbent volumes. The modified method may also be used for particulate adsorbents, where the particulate adsorbents include fillers, voids, structural components, or additives. Furthermore, the modified method may be used where the particulate adsorbents are not compatible with the standard method ASTM D5228, e.g., a representative adsorbent sample may not be readily placed as the 16.7 mL fill in the sample tube of the test.

For determining the nominal BWC of the honeycombs, the modified version of ASTM D5228 method was used as follows. The adsorbent sample is oven-dried for a minimum of eight hours at 110±5° C., and then placed in desiccators to cool down. The dry mass of the adsorbent sample is recorded. The mass of the empty testing assembly is determined before the adsorbent sample is assembled into a testing assembly. Then, the test assembly is installed into the flow apparatus and loaded with n-butane gas for a minimum of 25 minutes (±0.2 min) at a butane flow rate of 500 mL/min at 25° C. and 1 atm pressure. The test assembly is then removed from the BWC test apparatus. The mass of the test assembly is measured and recorded to the nearest 0.001 grams. This n-butane loading step is repeated for successive 5 minutes flow intervals until constant mass is achieved. For example, the total butane load time for a 35 mm diameter× 150 mm long honeycomb was 87-92 minutes. The test assembly may be a holder for a honeycomb or monolith part, for the cases where the nominal volume may be removed and tested intact. Alternatively, the nominal volume may need to be a section of the canister system, or a suitable reconstruction of the nominal volume with the contents appropriately oriented to the gas flows, as otherwise encountered in the canister system.

The test assembly is reinstalled to the test apparatus and purged with 2.00 liter/min air at 25° C. and 1 atm pressure for a set selected purge time (±0.2 min) according to the formula: Purge Time(min)=(719×Nominal Volume(mL))/(2000(mL/min)).

The direction of the air purge flow in the BWC test is in the same direction as the purge flow to be applied in the canister system. After the purge step, the test assembly is removed from the BWC test apparatus. The mass of the test assembly is measured and recorded to the nearest 0.001 grams within 15 minutes of test completion.

The nominal volume butane working capacity (BWC) of the adsorbent sample was determined using the following equation:

Nominal Volume BWC (g/dL)=Amount of Butane Purged (g)/Nominal Adsorbent Volume (dL), wherein Amount of Butane Purged=Mass of the test assembly after loading-Mass of the test assembly after purge.

The term "g-total BWC," as used herein, refers to g-amount of butane purged.

The Nominal Adsorbent Volume (mL) is calculated as, $V=(\pi D_o^2 L/4)/1000$, where Do=average adsorbent diameter (mm) and L=average adsorbent length (mm).

The Nominal Apparent Density (g/mL) is calculated as, Nominal Volume (mL)/mass of adsorbent (g).

The Butane Activity (g/100 g) is calculated as, BACT (g/100 g)=amount of butane loaded (g)/(100×mass of adsorbent (g)).

The Butane Purge Ratio (%)=BPR (%) is calculated as, amount of butane purged (g)/amount of butane loaded (g)×100.

Determination of Diurnal Breathing Loss (DBL) Emissions According to a BETP Test

TABLE 2

| | Examples 1-4. | | | |
|---|---|---|---|---|
| Description | Ex. 1 | Ex. 2 | Ex. 3 | Ex. 4 |
| Main Canister Type | #1 | #1 | #2 | #2 |
| Fuel Side Nominal Volume (L) | 2.10 | 2.10 | 1.80 | 1.80 |
| Adsorbent Type | BAX 1100 LD | BAX 1100 LD | BAX 1500 | BAX 1500 |
| Vent Side Nominal Volume (L) | N/A | N/A | 0.30 | 0.30 |
| Adsorbent Type | N/A | N/A | BAX LBE | BAX LBE |
| Additional Vent Side Adsorbent #1 | C2 29 × 100-200 | C2 29 × 100-200 | C2 35 × 150-200 | C2 35 × 150-200 |
| Nominal BWC (g/dL) | 4.2 | 4.2 | 4.2 | 4.2 |
| g-total BWC (g) | 2.8 | 2.8 | 6.1 | 6.1 |
| Additional Vent Side Adsorbent #2 | E1 29 × 100-200 | E1 29 × 100-200 | E1 35 × 150-200 | E1 35 × 150-200 |
| Nominal BWC (g/dL) | 2.2 | 2.2 | 2.3 | 2.3 |
| g-total BWC (g) | 1.5 | 1.5 | 1.5 | 1.5 |
| Fuel Tank Size (Total Gal) | 15 | 15 | 20 | 20 |
| Total Nominal Volume of Canister System (L) | 2.13 | 2.13 | 2.39 | 2.39 |
| Purge Applied After 40 g/hr Butane Loading Step (L) | 210 | 210 | 157.5 | 157.5 |

TABLE 2-continued

Examples 1-4.

| Description | Ex. 1 | Ex. 2 | Ex. 3 | Ex. 4 |
|---|---|---|---|---|
| Purge Applied After 40 g/hr Butane Loading Step BV | 98.6 | 98.6 | 66.0 | 66.0 |
| Worst Day DBL Emissions, mg | 7 | 7 | 12 | 10 |

TABLE 3

Comparative Examples 1-4.

| Description | CEx. 1 | CEx. 2 | CEx. 3 | CEx. 4 |
|---|---|---|---|---|
| Main Canister Type | #1 | #1 | #2 | #2 |
| Fuel Side Nominal Volume (L) | 2.10 | 2.10 | 1.80 | 1.80 |
| Adsorbent Type | BAX 1100 LD | BAX 1100 LD | BAX 1500 | BAX 1500 |
| Vent Side Nominal Volume (L) | N/A | N/A | 0.30 | 0.30 |
| Adsorbent Type | N/A | N/A | BAX LBE | BAX LBE |
| Additional Vent Side Adsorbent #1 | C2 29 × 100-200 | C2 29 × 100-200 | C2 35 × 150-200 | C2 35 × 150-200 |
| Nominal BWC (g/dL) | 4.2 | 4.2 | 4.2 | 4.2 |
| g-total BWC (g) | 2.8 | 2.8 | 6.1 | 6.1 |
| Additional Vent Side Adsorbent #2 | C1 29 × 100-200 | C1 29 × 100-200 | C1 35 × 150-200 | C1 35 × 150-200 |
| Nominal BWC (g/dL) | 2.3 | 2.3 | 2.0 | 2.1 |
| g-total BWC (g) | 1.5 | 1.5 | 2.9 | 3.0 |
| Fuel Tank Size (Total Gal) | 15 | 15 | 20 | 20 |
| Total Nominal Volume of Canister System (L) | 2.13 | 2.13 | 2.39 | 2.39 |
| Purge Applied After 40 g/hr Butane Loading Step (L) | 210 | 210 | 157.5 | 157.5 |
| Purge Applied After 40 g/hr Butane Loading Step BV | 98.6 | 98.6 | 66.0 | 66.0 |
| Worst Day DBL Emissions, mg | 5 | 5 | 13 | 12 |

Figure 5:
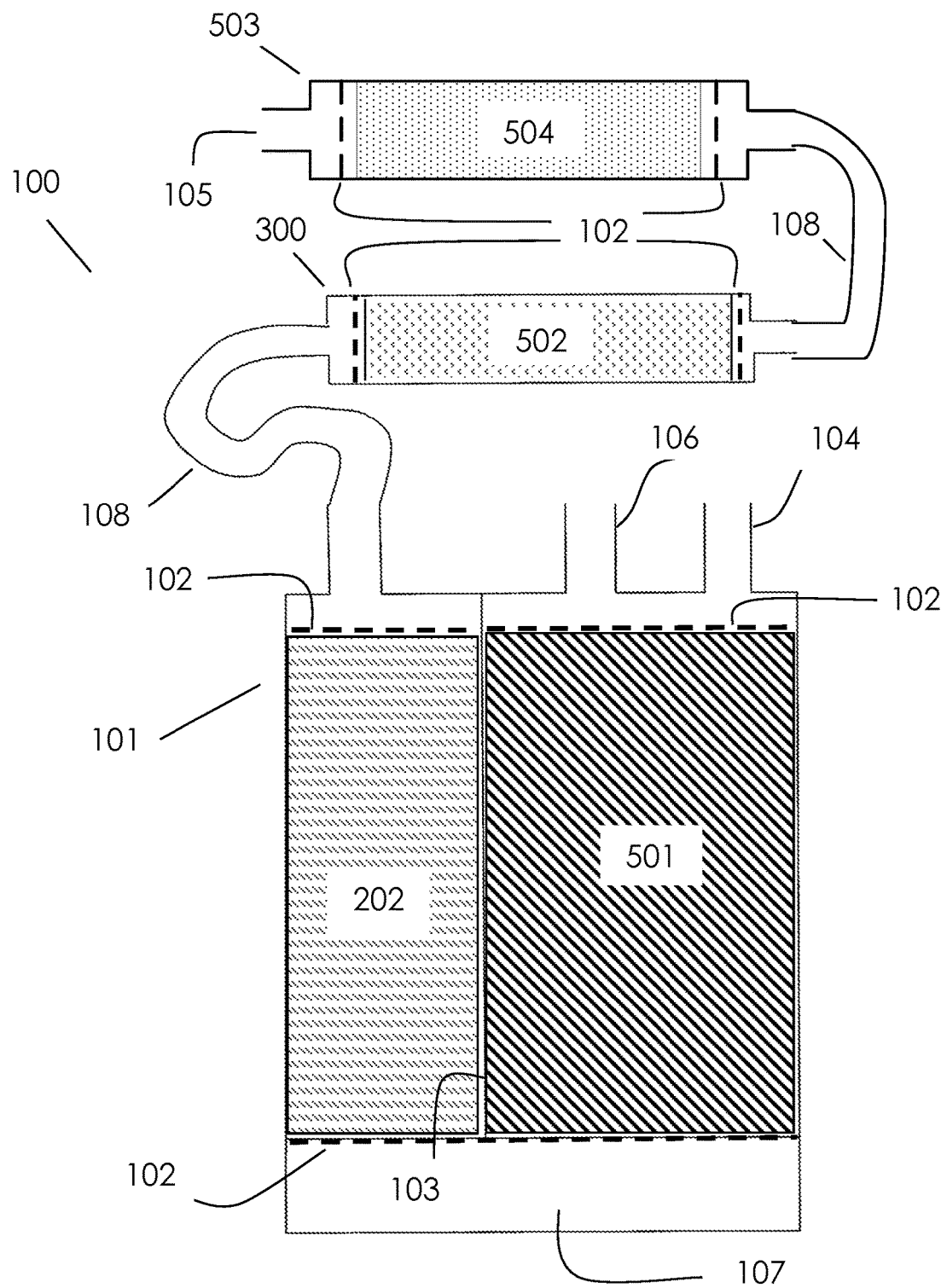
FIG. 5 is a cross-sectional view of an exemplary evaporative emission control canister system illustrating the system with which the DBL emissions performance of the comparative and inventive examples were measured when there were only two adsorbent volumes in the main canister and there were two PPAV honeycombs present inside in-series auxiliary vent-side canisters.

The evaporative emission control systems in the examples were tested by a protocol that include the following. For tests with the type #1 canister system, the defined 2.1 L canister that was used for generating the DBL emissions data was of the type illustrated in FIG. 5. The two pellet bed volumes 501 and 202 were located in a main canister 101, containing 1.40 L and 0.70 L of Nuchar® BAX 1100 LD pellets (Ingevity®, N. Charleston, SC, USA), respectively. There were two auxiliary canisters in-series, as illustrated in FIG. 5. The first auxiliary canister 300 contained a PPAV honeycomb as adsorbent volume 502 and the in-series second auxiliary canister 503 contained a PPAV honeycomb as adsorbent volume 504, with o-ring seals (not shown) and with non-adsorbent open cell foam disks 102 at each end of the two PPAV honeycombs.

Figure 6:
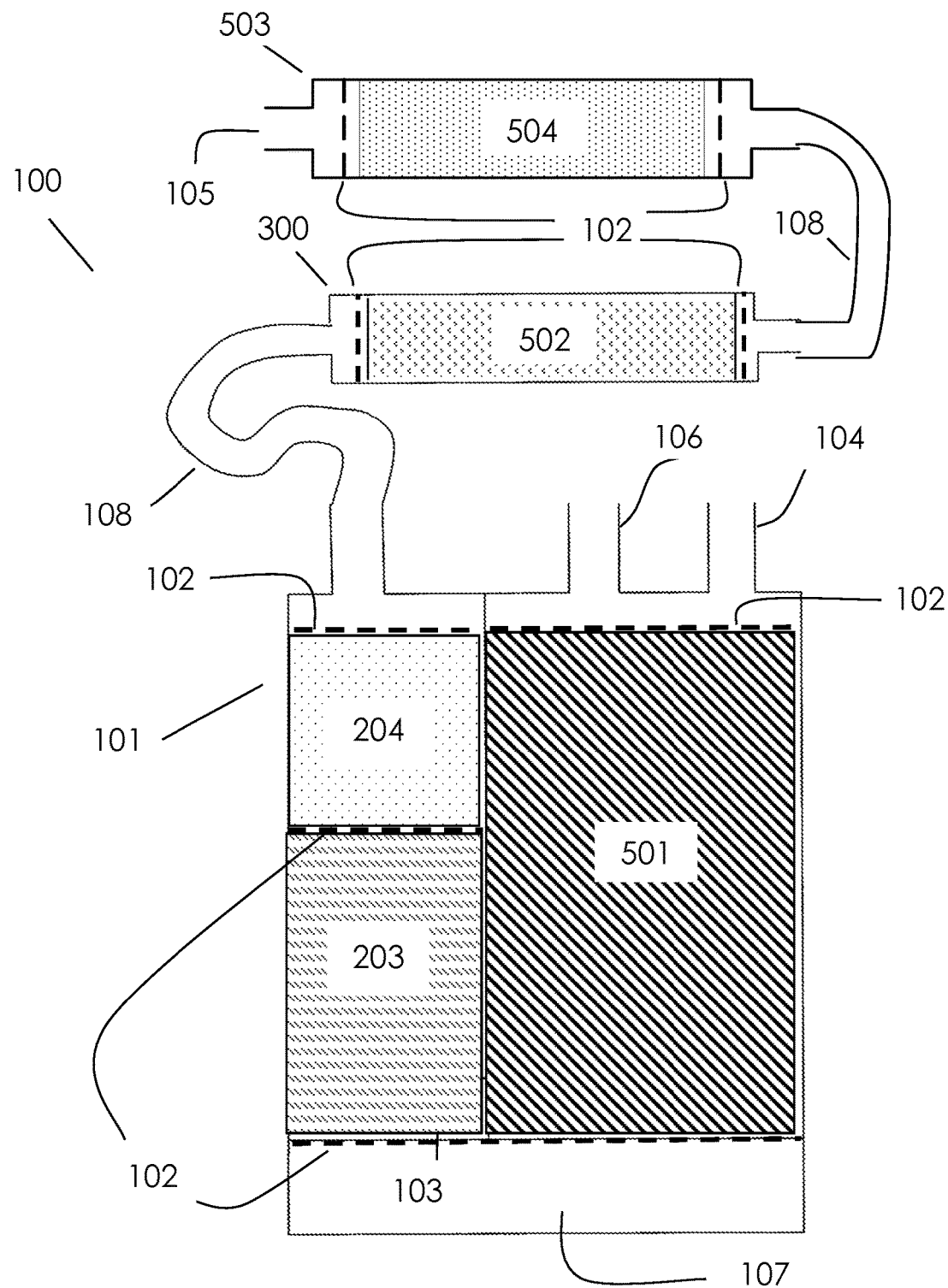
FIG. 6 is a cross-sectional view of an exemplary evaporative emission control canister system illustrating the system with which the DBL emissions performance of the comparative and inventive examples were measured when there were two PPAV honeycombs present inside in-series auxiliary vent-side canisters.

For tests with the type #2 canister system, the defined 2.1 L canister that was used for generating the DBL emissions data was of the type illustrated in FIG. 6. The three pellet bed volumes 501, 203, and 204 were located in a main canister 101, containing 1.40 L, 0.40 L and 0.30 L of pellets, respectively. Again, there were two auxiliary canisters in-series. The first auxiliary canister 300 contained a PPAV honeycomb as adsorbent volume 502 and the in-series second auxiliary canister 503 contained a PPAV honeycomb as adsorbent volume 504, with o-ring seals (not shown) and with non-adsorbent open cell foam disks 102 at each end of the two PPAV honeycombs. In the type #2 system, there was 1.40 L of Nuchar® BAX 1500 (Ingevity®, North Charleston, South Carolina, USA) as adsorbent volume 501, with about a 19.5 cm height above the support screen 102 located above the plenum 107, plus a 0.40 L adsorbent volume 203 of BAX 1500 with about a 11.1 cm height above the support screen 102 located above the plenum 107, and plus a 0.30 L adsorbent volume 204 of Nuchar® BAX LBE (Ingevity®, N. Charleston, SC, USA) with about a 8.4 cm height above a support screen 102 between adsorbent volumes 203 and 204. The adsorbent volume 501 had an average width of 9.0 cm from the dividing wall 103 to the right side wall of the canister, and the adsorbent volumes 203 and 204 have average widths of about 4.5 cm from the dividing wall 103 to its left sidewall. Adsorbent volumes 501, 203, and 204 had similar depths (into the page in FIG. 6) of 8.0 cm. Each adsorbent bed of pellets was filled with the dry-basis mass determined by the apparent density that would meet the respective volume target (mass fill=AD×volume target).

Each example canister system was uniformly preconditioned (aged) by repetitive cycling of gasoline vapor adsorption using certified Tier 3 fuel (8.7-9.0 RVP, 10 vol % ethanol) and 300 nominal bed volumes of dry air purge at 22.7 LPM based on the main canister (e.g., 630 liters for a 2.1 L main canister). (The U.S. RE38,844 work was conducted with certified TF-1 fuel.) The gasoline vapor load rate was 40 g/hr and the hydrocarbon composition was 50 vol %, generated by heating two liters of gasoline to about 38° C. and bubbling air through at 200 ml/min. The two-liter aliquot of fuel was replaced automatically with fresh gasoline every 1 hr 55 min until 5000 ppm breakthrough as butane was detected by an FID (flame ionization detector) or infrared detector. A minimum of 25 aging cycles were used on a virgin canister. The gasoline working capacity (GWC) was measured as the average weight gain of loaded vapors and loss of purged vapors for the last 2-3 cycles and is reported as grams per liter of adsorbent volumes in the canister system. In proceeding further to measure bleed emission performance, the GWC aging cycles were followed by a single butane adsorption/air purge step. This step was to load butane at 40 g/hour at a 50 vol % concentration in air at one atm to 5000 ppm breakthrough, soak for one hour, then purge with dry air for 21 minutes with a total purge volume attained by selecting the appropriate constant air purge rate for that period. The canister system was then soaked with the ports sealed for about 14-18 hrs at about 25° C. (where 12-36 hrs is the requirement for the soak time). The total purge volume following the above single butane adsorption loading was 210 L, equivalent, for example, to about 92-94 BV for a complete canister system that includes all adsorbent volumes present, e.g., the 2.1 L adsorbent volume fills of the defined canister, plus a vent-side activated carbon honeycomb adsorbent 502 placed in the subsequent auxiliary canister 300, or two activated carbon honeycomb adsorbents 502 and 504 placed in subsequent in-series auxiliary canisters 300 and 503. In these configurations, the volume to be added to the adsorbent pellet volumes in the defined main canister was the caliper measured dimensional volume of the activated carbon honeycomb present within auxiliary canister 300, plus, if present, the caliper-measured dimensional volume of the second activated carbon honeycomb within the in-series auxiliary canister 503.

The DBL emissions were subsequently generated by attaching the tank port of the example to a fuel tank filled with CARB LEV III fuel (6.9-7.2 RVP, 10% ethanol). (The U.S. RE38,844 work was conducted CARB Phase II fuel.) The canister system examples with the majority of pellets present as BAX 1500 carbon in the main canister were connected to a 20 gallon tank (total volume) filled with 6.2 gallons of liquid fuel (13.8 gal ullage). The canister system examples with BAX 1100 LD in the main canister were connected to a 15 gallon tank (total volume) filled with 4.0 gallons of liquid fuel (11 gal ullage).

Prior to attachment, the filled fuel tank had been stabilized at 18.3° C. for 18-20 hours while venting (where 12-36 hrs is the requirement of the soak time while venting). The tank and the canister system were then temperature-cycled per CARB's two-day temperature profile, each day from 18.3° C. to 40.6° C. over 11 hours, then back down to 18.3° C. over 13 hours. Emission samples were collected from the example vent at 6 hours and 12 hours during the heat-up stage into Kynar bags (to allow the fuel in the tank to reach peak temperature). The Kynar bags were filled with nitrogen to a known total volume based on pressure and then evacuated into a FID to determine hydrocarbon concentration. The FID was calibrated with a precisely known-butane standard of about 5000 ppm concentration. From the Kynar bag volume, the emissions concentration, and assuming an ideal gas, the mass of emissions (as butane) was calculated. For each day, the mass of emissions at 6 hours and 12 hours were added. Following CARB's protocol the day with the highest total emissions was reported as "2-day emissions." In all cases, the highest emissions were on Day 2. This procedure is generally described in SAE Technical Paper 2001-01-0733, titled "Impact and Control of Canister Bleed Emissions," by R. S. Williams and C. R. Clontz, and in CARB's LEV III BETP procedure (section D.12 in California Evaporative Emissions Standards and Test Procedures for 2001 and Subsequent Model Motor Vehicles, Mar. 22, 2012).

Exemplary and comparative examples 1-2 used the 2.1 L main canister filled with BAX 1100 LD (nominal BWC>11 g/dL and nominal IAC>35 g/L) and the 15 gallon total volume fuel tank. Exemplary and comparative examples 3-4 used the 2.1 L main canister filled with 1.8 L BAX 1500 (nominal BWC>14.8 g/dL and nominal IAC>35 g/L) and 0.3 L BAX LBE (nominal BWC 5-7.5 g/dL and nominal IAC<35 g/L) and the 20 gallon total volume fuel tank.

Following the main canister, each example had first a commercial honeycomb with nominal BWC≥3 g/dL and nominal IAC<35 g/L (Nuchar® HCA, Ingevity®, N. Charleston, SC, USA) followed by a lower capacity honeycomb (nominal BWC<3 g/dL and nominal IAC<35 g/L). In the case of comparative examples, the lower capacity honeycomb was Nuchar® HCA-LBE (Ingevity®, N. Charleston, SC, USA); whereas for the exemplary examples, the lower capacity honeycomb was as described herein. The terms 29×100-200 and 35×150-200 represent the nominal honeycomb dimensions as diameter (mm)×length (mm)— extruded cell density (cells per square inch).

Figure 7:
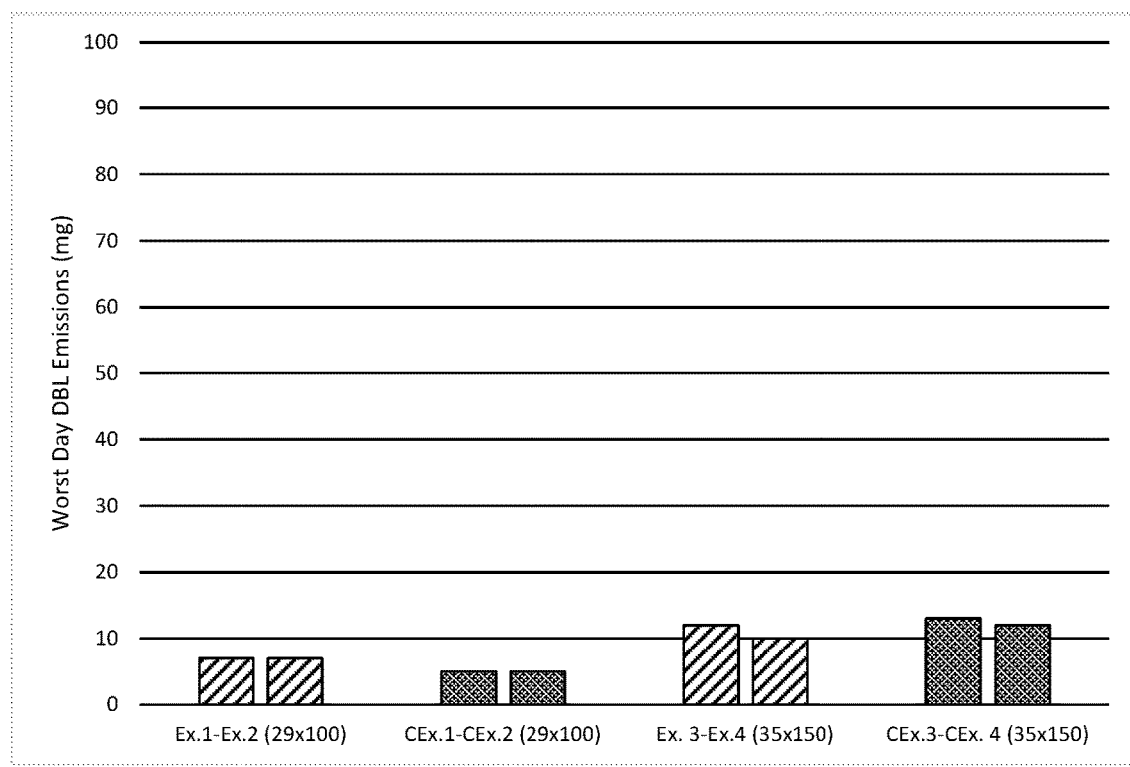
FIG. 7 shows a comparison of the worst day emission (mg) for the exemplary and comparative formulations for two different sample sizes.

Results in Table 2 and 3 showed exemplary and comparative examples 1 and 2 yielded similar worst day emissions; as did exemplary and comparative examples 3 and 4. This is also shown in FIG. 7. The similarity in emission results between exemplary and comparative examples is surprising and unexpected given the substantial simultaneous increase in extruder die lifetime shown in FIGS. 8 and 9.

Figure 8:
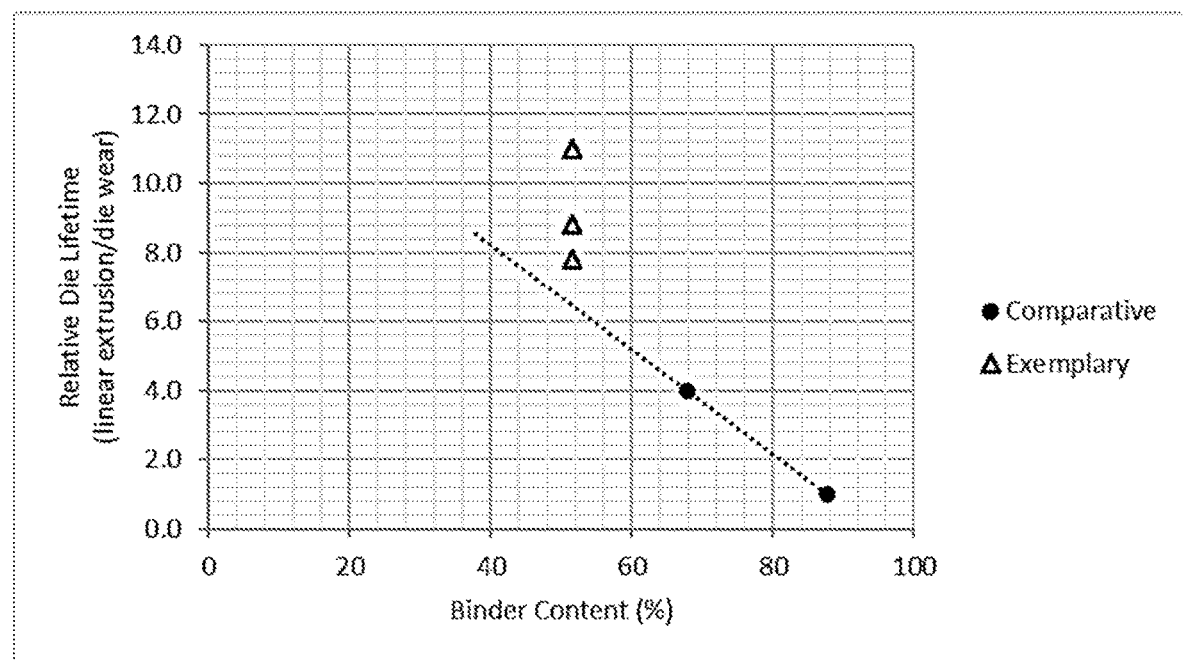
FIG. 8 shows the effect on die wear for the comparative examples as compared to exemplary formulations as described herein.
Figure 9:
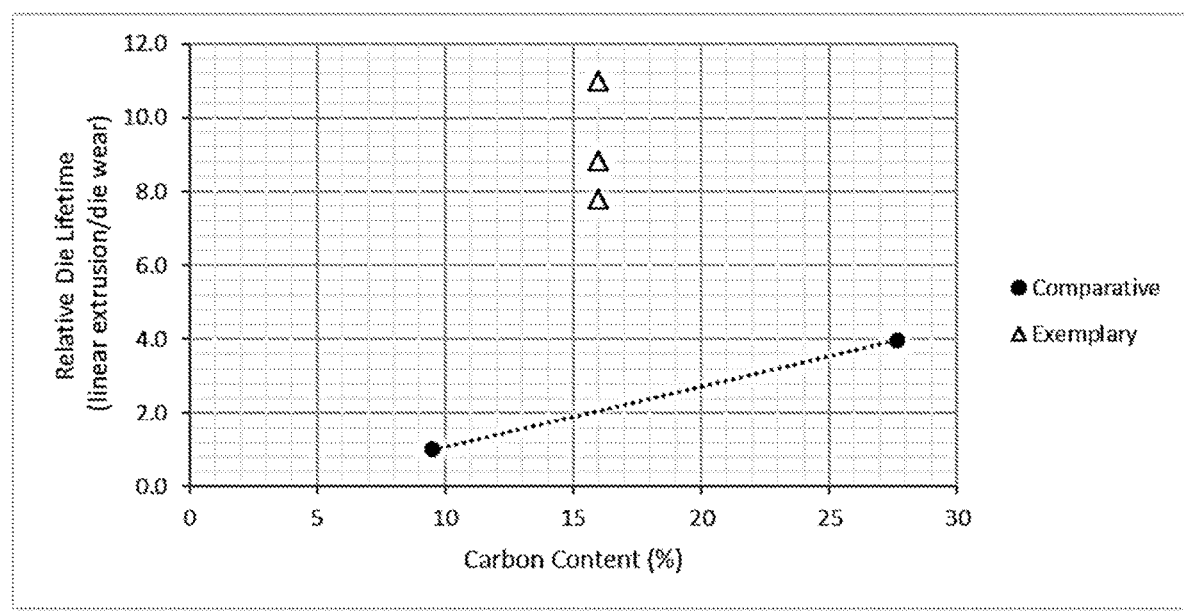
FIG. 9 shows the effect on die wear for the comparative examples as compared to exemplary formulations as described herein.

FIG. 8 shows the lifetime of the die used for extruding the PPAV adsorbents as a function of the amount of binder in both exemplary and comparative formulations. While the lifetime increases somewhat as binder content of the comparative formulations decreases, the lifetime is surprisingly significantly higher for the exemplary formulations due to the use of the glass microspheres. The same can also be seen as a function of carbon content in FIG. 9. The extruder die lifetime increases somewhat with carbon content due to the reduction of binder content. But the die lifetime increases substantially in the case of exemplary formulations due to the use of glass microspheres. For both FIGS. 8 and 9, the exemplary formulations used were E1.

Determination Surface Areas

Surface areas were measured by nitrogen physisorption using the by the Brunauer-Emmet-Teller (BET) method according to ISO 9277:2010 in a Micromeritics ASAP 2420 (Norcross, GA). The sample preparation procedure was to degas at 250° C. for at least two hours, typically to a stable <2 μmHg vacuum with the sample isolated. The nitrogen adsorption isotherm was recorded at 77 K for a 0.1 g sample, targeting the following pressures: 0.04, 0.05, 0.085, 0.125, 0.15, 0.18, 0.2, 0.355, 0.5, 0.63, 0.77, 0.9, 0.95, 0.995, 0.95, 0.9, 0.8, 0.7, 0.6, 0.5, 0.45, 0.4, 0.35, 0.3, 0.25, 0.2, 0.15, 0.12, 0.1, 0.07, 0.05, 0.03, 0.01. Actual points were recorded within an absolute or relative pressure tolerance of 5 mmHg or 5%, respectively, whichever was more stringent. Time between successive pressure readings during equilibration was 10 seconds. The non-ideality factor was 0.0000620. The density conversion factor was 0.0015468. The thermal transpiration hard-sphere diameter was 3.860 Å. The molecular cross-sectional area was 0.162 nm$^2$. The data in the range of 0.05 to 0.20 relative pressure of the nitrogen adsorption isotherm was used to apply the BET model.

Determination of Pore Volumes

Pore volume in the range of 0.05 micrometer to 100 micrometers was measured by mercury intrusion porosimetry method ISO 15901-1:2016. The equipment used for the examples was a Micromeritics Autopore V (Norcross, GA). Samples used were around 0.4 g in size and pre-treated for at least 1 hour in an oven at 105° C. The surface tension of mercury and contact angle used for the Washburn equation were 485 dynes/cm and 130°, respectively.

Determination of Incremental Adsorption Capacity

Micromeritics method. As known in the art, adsorption capacities may be equivalently measured by a number of means, including volumetric, gravimetric, and dynamic (flow) methods.

The "Micromeritics method" is a volumetric method based on a gas phase mass balance for the adsorbent sample-containing system of known volume and temperature when exposed to changes in adsorbate gas phase pressure. For examples herein, a Micromeritics model ASAP 2020A expansion unit was used (Micromeritics Instrument Corporation, Norcross, GA USA). By this method, as an initial state, adsorbate gas is contained in one vessel of known temperature, pressure, and volume, and adsorbate gas is contained in a second, adsorbent-containing vessel of known volume and temperature, and a known different pressure. The two vessels are then made in fluid contact by the opening of a connecting valve. After equilibration to a final state (i.e., sufficient time for thermal equilibration and equilibrated adsorbate uptake by the adsorbent sample, as evidenced by a stabilized connected system pressure), the mass balance difference in gas phase adsorbate between the initial and final state is the mass change in adsorbed adsorbate by the adsorbent sample. Note in all examples reported herein, the adsorbate is n-butane.

The first step to determine IAC is sample preparation. The representative adsorbent sample is oven-dried for more than 3 hours at 110° C. The adsorbent sample shall include representative amounts of any inert binders, fillers and structural components present in the nominal volume of the adsorbent component when the Apparent Density value determination equivalently includes the mass of the inert binders, fillers, and structural components in its mass numerator. Conversely, the adsorbent sample shall exclude these inert binders, fillers, and structural components when the Apparent Density value equivalently excludes the mass of the inert binders, fillers, and structural components in its numerator. The universal concept is to accurately define the adsorptive properties for butane on a volume basis within the nominal volume.

A quartz sample tube is weighed with a rubber stopper and the weight recorded (WO). About 0.1 g of adsorbent sample is loaded into the tared sample tube and the rubber stopper replaced. The rubber stopper is removed, and the loaded sample tube is placed under a degassing port where the temperature is ramped to 250° C. at a rate of 10° C./min. The sample is degassed at 250° C. for about 2 hours. The sample is allowed to cool and the tube is backfilled with nitrogen. The rubber stopper is replaced and the degassed tube is weighed (W). Dry sample weight is calculated as W−WO. The second step in the procedure is sample analysis. The water bath is set to 25±0.1° C. The instrument sample pressure is evacuated to less than 10 μmHg (usually less than 1 μmHg). The instrument plug and sample rubber stopper are removed, and the degas sed tube is placed into the sample analysis port. The test is started. The instrument collects equilibrium butane isotherm data points around the following absolute pressures (mmHg): 10, 20, 30, 40, 45, 150, 300, 350, 400, 450, 600, 800, 600, 500, 450, 400, 350, 300, 150, 50, 45, 40, 35, 30, 25). The mass adsorbed isotherm data point for 0.5 vol % at 1 atm (3.8 mmHg) reported herein was calculated from a power law regression (mass adsorbed=a Pressure$^b$) derived from a fit of the 10, 20, 30, and 40 mmHg isotherm data points.

The IAC has been defined as the incremental adsorption capacity between 5 and 50% n-butane at 25° C. A 5 vol % n-butane concentration (in volume) at one atmosphere is provided by the equilibrium pressure inside the sample tube of 38 mmHg. A 50 vol % n-butane concentration at one atmosphere is provided by the equilibrium pressure inside the sample tube of 380 mmHg. Because equilibration at precisely 38 mmHg and 380 mmHg may not be readily obtained, the mass of adsorbed n-butane per mass of the adsorbent sample at 5 vol % n-butane concentration and at 50 vol % n-butane concentration is interpolated from a graph using the data points collected about the target 38 and 380 mmHg pressures. In the examples provided herein, this was typically done using linear regression of the pressures between about 300 and about 450 mmHg and the pressures between about 30 and 45 mmHg on the desorption branch of the isotherm. Using the ideal gas law for n-butane and the adsorbent apparent density, the IAC can then be calculated as the capacity in g/g at 50 vol % n-butane minus the capacity at 5 vol % n-butane multiplied by the apparent density in g/L.

The McBain method is a gravimetric method. The adsorbent sample is oven-dried for more than 3 hours at 110° C. before loading onto a sample pan attached to a spring inside a sample tube. Then, the sample tube is installed into an apparatus as described. The adsorbent sample shall include representative amounts of any inert binders, fillers and structural components present in the nominal volume of the adsorbent component when the Apparent Density value determination equivalently includes the mass of the inert binders, fillers, and structural components in its mass numerator. Conversely, the adsorbent sample shall exclude these inert binders, fillers, and structural components when the Apparent Density value equivalently excludes the mass of the inert binders, fillers, and structural components in its numerator. The universal concept is to accurately define the adsorptive properties for butane on a volume basis within the nominal volume.

A vacuum of less than 1 torr is applied to the sample tube, and the adsorbent sample is heated at 105° C. for 1 hour. The mass of the adsorbent sample is then determined by the extension amount of the spring using a cathetometer. After that, the sample tube is immersed in a temperature-controlled water bath at 25° C. Air was pumped out of the sample tube until the pressure inside the sample tube is $10^{-4}$ torr. n-Butane is introduced into the sample tube until equilibrium was reached at a selected pressure. The tests are performed for two data sets of four selected equilibrium pressures each, taken about 38 torr and taken about 380 torr. The concentration of n-butane is based on the equilibrium pressure inside the sample tube. After each test at the selected equilibrium pressure, the mass of the adsorbent sample is measured based on the extension amount of the spring using cathetometer. The increased mass of the adsorbent sample is the amount of n-butane adsorbed by the adsorbent sample. The mass of n-butane absorbed (in gram) per the mass of the adsorbent sample (in gram) is determined for each test at different n-butane equilibrium pressures and plotted in a graph as a function of the concentration of n-butane (in % volume). A 5 vol % n-butane concentration (in volume) at one atmosphere is provided by the equilibrium pressure inside the sample tube of 38 torr. A 50 vol % n-butane concentration at one atmosphere is provided by the equilibrium pressure inside the sample tube of 380 torr. Because equilibration at precisely 38 torr and 380 torr may not be readily obtained, the mass of adsorbed n-butane per mass of the adsorbent sample at 5 vol % n-butane concentration and at 50 vol % n-butane concentration is interpolated from a graph using the data points collected about the target 38 and 380 torr pressures. The IAC is then calculated as described herein.

Determination of Effective Volumetric Properties

The above methods are applicable for defining the nominal BWC, butane activity, IAC, and density properties of adsorbent. In contrast, the effective volume of adsorbents takes into account the air gaps, voids and other volumes sandwiched between the nominal volumes of adsorbents along the vapor flow path that lack adsorbent. For example, those volumes lacking adsorbent include, but are not limited to, the volumes between adsorbent volume 301 and 302 in FIG. 4, the volume between adsorbent volume 204 and 301 in FIG. 4 that includes the port 108 and the connecting conduit between canisters 101 and 300, and the volume between adsorbent volumes 202 and 203 in FIG. 4 that includes the plenum volume 107. Thus, the effective volumetric properties of adsorbent refer to the volume-averaged properties of the adsorbent volumes that take into account air gaps, voids and other volumes between the nominal volumes of adsorbents that lack adsorbent along the vapor flow path. These properties are determined as described in U.S. Pat. No. 9,732,649 and herein incorporated by reference.

The effective volume ($V_{eff}$) for a given length of the vapor flow path is the sum of the nominal volumes of adsorbent ($V_{nom, i}$) present along that vapor path length plus adsorbent-free volumes along that vapor flow path ($V_{gap, j}$).

$$V_{eff} = \Sigma V_{nom, i} + V_{gap, j}$$

A volumetric adsorptive properties of an effective volume ($B_{eff}$), such as incremental adsorption capacity (g/L), apparent density (g/mL) and BWC (g/dL), is the sum of each property of the individual nominal volumes to be considered as part of the effective volume ($B_{nom, i}$) multiplied by each individual nominal volume ($V_{nom, i}$), then divided by the total effective volume ($V_{eff}$):

$$B_{eff} = \Sigma (B_{nom, i} \times V_{nom, i})/V_{eff}$$

Thus, the term "effective incremental adsorption capacity" is the sum of each nominal incremental adsorption capacity multiplied by each individual nominal volume, and then divided by the total effective volume.

The term "effective butane working capacity (BWC)" is the sum of each BWC value multiplied by each individual nominal volume, and then divided by the total effective volume.

The term "effective apparent density" is the sum of each apparent density multiplied by each individual nominal volume, and then divided by the total effective volume The term "g-total BWC of the effective volume" is the sum of the g-total BWC gram values of the nominal volumes within the effective volume.

Those skilled in the art will recognize, or be able to ascertain using no more than routine experimentation, many equivalents to the specific embodiments of the invention described herein. Such equivalents are intended to be encompassed by the following claims. It is understood that the detailed examples and embodiments described herein are given by way of example for illustrative purposes only, and are in no way considered to be limiting to the invention. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present invention will be apparent from the appended claims. Moreover, any of the aspects or embodiments described herein can be combined collectively or in the alternative and that all such combinations are expressly contemplated and to not represent intermediate generalizations.

What is claimed is:

1. An adsorbent composition comprising:
   from about 10 to about 50 wt % of an activated adsorbent material;
   from about 3 to about 40 wt % of glass microspheres;
   from about 5 to about 50 wt % of clay binder; and
   the difference to 100 wt % with at least one additive material, wherein the adsorbent composition is in the form of a honeycomb monolith.

2. The adsorbent composition of claim 1, wherein the activated adsorbent material comprises activated carbon, carbon charcoal, zeolites, clays, porous polymers, porous alumina, porous silica, molecular sieves, kaolin, titania, ceria, or a combination thereof.

3. The adsorbent composition of claim 1, wherein the activated adsorbent material comprises an activated carbon powder.

4. The adsorbent composition of claim 1, wherein the activated adsorbent material is derived from at least one of wood, wood dust, wood flour, cotton linters, peat, coal, coconut, lignite, carbohydrates, petroleum pitch, petroleum coke, coal tar pitch, fruit pits, fruit stones, nut shells, nut pits, sawdust, palm, vegetables, a synthetic polymer, natural polymer, lignocellulosic material, or a combination thereof.

5. The adsorbent composition of claim 2, wherein the activated carbon is characterized by a nitrogen B.E.T. surface area from about 600 to about 2200, or from about 800 to about 1800, or about 1000 to about 1600 square meters per gram.

6. The adsorbent composition of claim 1, wherein the additive material comprises (i) at least one of an organic binder, a calcined clay binder, a mineral flux or a combination thereof, (ii) excludes ball clay or (iii) a combination of (i) and (ii).

7. The adsorbent composition of claim 6, wherein the mineral flux is a feldspathic mineral.

8. The adsorbent composition of claim 6, wherein the mineral flux is nepheline syenite.

9. The adsorbent composition of claim 6, wherein the organic binder comprises a cellulose, a cellulose derivative, or a combination thereof.

10. The adsorbent composition of claim 9, wherein the organic binder comprises at least one of carboxymethyl cellulose, methyl cellulose, ethyl cellulose, ethyl methyl cellulose, hydroxyethyl cellulose, hydroxypropyl cellulose, hydroxyethyl methyl cellulose, hydroxypropyl methyl cellulose, methyl hydroxyethyl cellulose, ethyl hydroxyethyl cellulose, crystalline salts of aromatic sulfonates, polyfurfuryl alcohols, polyesters, polyepoxides, polyurethane polymers, polyvinyl alcohol or a combination thereof.

11. The adsorbent composition of claim 6, wherein the clay binder comprises zeolite clay, bentonite clay, montmorillonite clay, illite clay, French green clay, pascalite clay, redmond clay, terramin clay, living clay, Fuller's Earth clay, ormalite clay, vitallite clay, rectorite clay, cordierite, ball clay, kaolin or a combination thereof.

12. The adsorbent composition of claim 6, wherein the clay binder is a hydrous kaolin.

13. The adsorbent composition of claim 6, wherein the calcined binder material comprises calcined kyanite, mullite, cordierite, clay grog, silica, alumina, and other calcined or non-plastic refractory ceramic materials, or a combination thereof.

14. The adsorbent composition of claim 1, wherein the glass microspheres have an average diameter of less than about 500 micrometers.

15. An evaporative emission control canister system comprising the adsorbent article of claim 1.

* * * * *